United States Patent
Bangalore Ramaiah et al.

(10) Patent No.: US 11,314,974 B2
(45) Date of Patent: Apr. 26, 2022

(54) DETECTING DEBRIS IN A VEHICLE PATH

(71) Applicant: Hitachi Automotive Systems, Ltd., Ibaraki (JP)

(72) Inventors: Naveen Kumar Bangalore Ramaiah, Farmington Hills, MI (US); Subrata Kumar Kundu, Canton, MI (US)

(73) Assignee: HITACHI ASTEMO, LTD., Hitachinaka (JP)

( * ) Notice: Subject to any disclaimer, the term of this patent is extended or adjusted under 35 U.S.C. 154(b) by 103 days.

(21) Appl. No.: 16/833,759

(22) Filed: Mar. 30, 2020

(65) Prior Publication Data
US 2021/0303875 A1 Sep. 30, 2021

(51) Int. Cl.
| | |
|---|---|
| G06K 9/00 | (2006.01) |
| G08G 1/16 | (2006.01) |
| G06K 9/32 | (2006.01) |
| B60W 30/09 | (2012.01) |
| B60W 50/14 | (2020.01) |
| G06T 7/13 | (2017.01) |

(52) U.S. Cl.
CPC ......... *G06K 9/00805* (2013.01); *B60W 30/09* (2013.01); *B60W 50/14* (2013.01); *G06K 9/00798* (2013.01); *G06K 9/3233* (2013.01); *G06T 7/13* (2017.01); *G08G 1/16* (2013.01); *B60W 2050/146* (2013.01); *B60W 2420/42* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 7,741,961 B1 * | 6/2010 | Rafii | B60Q 9/005 340/435 |
| 2010/0054538 A1 * | 3/2010 | Boon | G06T 7/246 382/104 |
| 2015/0086080 A1 * | 3/2015 | Stein | H04N 7/183 382/104 |
| 2016/0093057 A1 | 3/2016 | Lin et al. | |
| 2017/0220876 A1 * | 8/2017 | Gao | G06K 9/3241 |
| 2017/0323179 A1 * | 11/2017 | Vallespi-Gonzalez | G05D 1/0251 |
| 2018/0211117 A1 * | 7/2018 | Ratti | G06K 9/00785 |
| 2019/0120967 A1 * | 4/2019 | Smits | G01C 21/3461 |
| 2020/0023797 A1 * | 1/2020 | Volos | G07C 5/008 |
| 2020/0238991 A1 * | 7/2020 | Aragon | G06K 9/2054 |
| 2021/0097311 A1 * | 4/2021 | McBeth | G06N 20/00 |
| 2021/0264175 A1 * | 8/2021 | Zhang | B60W 60/001 |

* cited by examiner

*Primary Examiner* — Santiago Garcia
(74) *Attorney, Agent, or Firm* — Mattingly & Malur, PC

(57) ABSTRACT

In some examples, one or more processors may receive at least one image of a road, and may determine at least one candidate group of pixels in the image as potentially corresponding to debris on the road. The one or more processors may determine at least two height-based features for the candidate group of pixels. For instance, the at least two height-based features may include a maximum height associated with the candidate group of pixels relative to a surface of the road, and an average height associated the candidate group of pixels relative to the surface of the road. In addition, the one or more processors may determine at least one weighting factor based on comparing the at least two height-based features to respective thresholds, and may determine whether the group of pixels corresponds to debris based at least on the comparing.

20 Claims, 20 Drawing Sheets

FIG. 13

| FEATURES — 1702 | THRESHOLD — 1704 | FALSE POSITIVE RATE — 1706 | TRUE POSITIVE RATE — 1708 |
|---|---|---|---|
| AVERAGE HEIGHT — 1710 | 0.02595 | 0 | 96.0526 |
| MAXIMUM HEIGHT — 1712 | 0.05 | 4.2553 | 94.7368 |
| MAXIMUM SLOPE — 1714 | 5 | 6.383 | 92.1053 |
| AVERAGE SLOPE — 1716 | 1.3927 | 4.2553 | 90.7895 |
| PEAK SLOPE PERCENTAGE — 1718 | 22.429 | 8.5106 | 92.1053 |

1720 STRONG FEATURES (1710, 1712)
1722 WEAK FEATURES (1714, 1716, 1718)

DETECTING DEBRIS IN A VEHICLE PATH

BACKGROUND

Advanced driver assistance systems (ADAS), as well as semi-autonomous vehicle systems, self-driving systems, or otherwise autonomous driving (AD) systems are systems that automate or otherwise enhance vehicle control for improved safety, automated navigation, and the like. These systems typically include a function for recognizing other vehicles, large obstacles, pedestrians, etc., in the roadway to avoid collisions. However, detecting and avoiding debris in the travel path of a vehicle can be more challenging than detecting larger obstacles, such as due to the generally smaller size of debris as well as the huge variations in possible types of debris. Recent surveys indicate that approximately 200,000 crashes in the US between 2011 and 2014 involved debris and resulted in around 500 deaths. Accordingly, detecting and avoiding debris on roadways can improve vehicle safety, reduce accidents, reduce vehicle damage, and the like.

SUMMARY

In some implementations, one or more processors may receive at least one image of a road, and may determine at least one candidate group of pixels in the image as potentially corresponding to debris on the road. The one or more processors may determine at least two height-based features for the candidate group of pixels. For instance, the at least two height-based features may include a maximum height associated with the candidate group of pixels relative to a surface of the road, and an average height associated the candidate group of pixels relative to the surface of the road. In addition, the one or more processors may determine at least one weighting factor based on comparing the at least two height-based features to respective thresholds, and may determine whether the group of pixels corresponds to debris based at least on the comparing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 13 illustrates an example of the selected candidate of FIG. 12 as a 3D map in matrix form according to some implementations.

FIG. 17 illustrates an example data structure including features and corresponding feature strength according to some implementations.

DESCRIPTION

Figure 1:
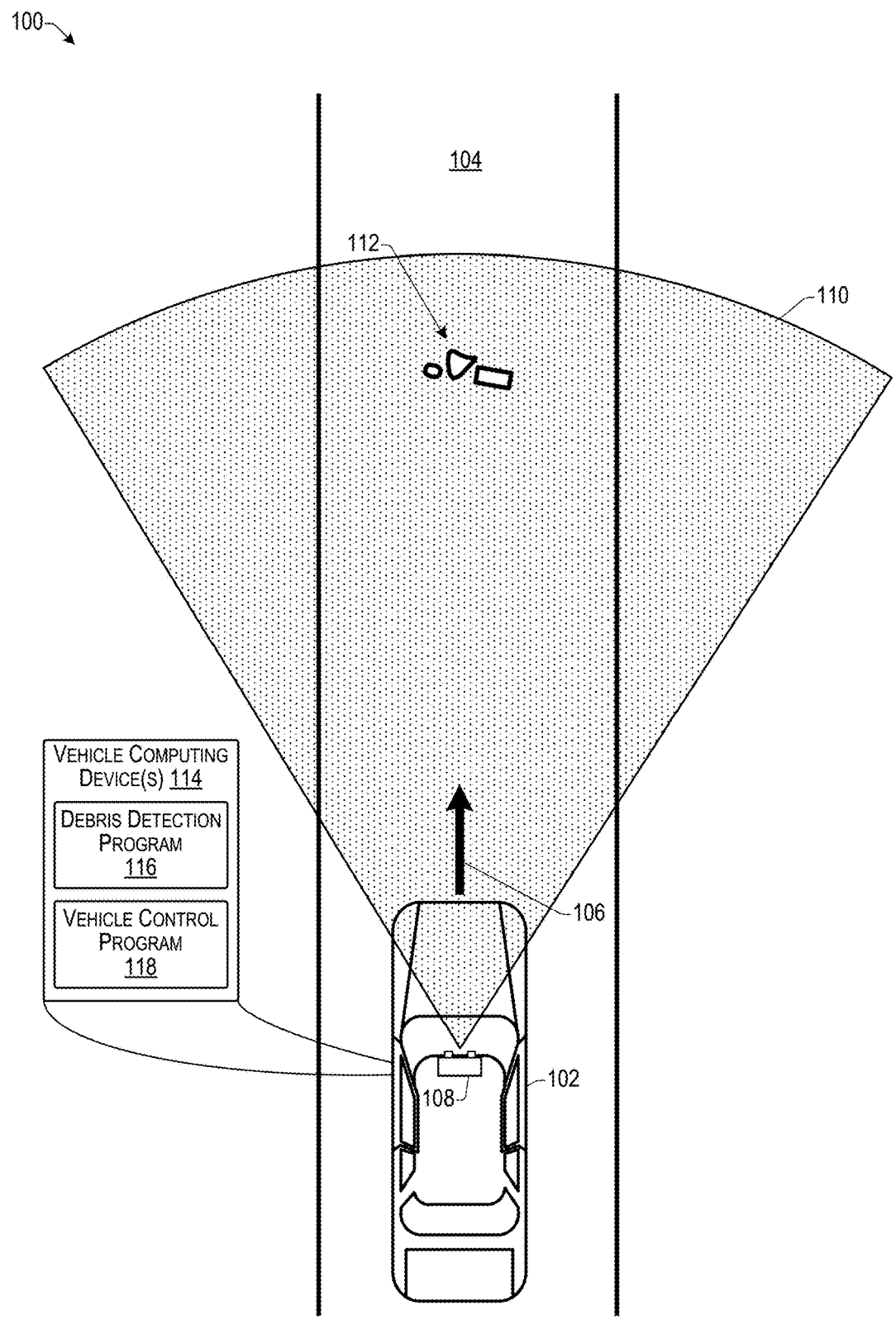
FIG. 1 illustrates an example debris detection system configured for detecting debris in the path of a vehicle according to some implementations.

Some implementations herein are directed to techniques and arrangements able to detect small obstacles and other types of debris in the travel path of a vehicle, such as to assist ADAS and AD controllers, as well as for improving safety and comfort of vehicle occupants. For instance, the debris detection system may be capable of detecting the location and height of debris in a travel path in real time using only input from a camera. As one example, the camera may provide image data that the system may use to determine roadway edges and to generate a disparity map for extracting candidates for debris recognition. Furthermore, the system may use a pixel validation technique to extract multiple features and may employ strong and weak feature-based classifiers to detect debris in real time and with lower cost than conventional techniques. For example, conventional techniques may employ multiple different types of sensors such as cameras, radar, LIDAR, and fusion technology to provide a debris detection system, which may be expensive both in the hardware required and in the amount of computational capacity required.

Furthermore, the heights of obstacles detected by conventional ADAS and AD technologies, such as for pedestrian detection, vehicle detection and obstacle detection are typically comparatively higher than usual roadway debris. Accordingly, in some examples herein, the debris detected may include any small obstacle or foreign object that is on the road surface and that can be hazardous to the vehicle or vehicle occupants, or that might otherwise cause discomfort to the vehicle occupants. For example, debris might be generated due to objects falling off other vehicles, due to accidents, due to road construction, and so forth. Debris on a roadway can cause damage to a vehicle and, in some cases, can endanger the driver or other vehicle occupants. For instance, debris may cause a tire blowout or other tire damage, may cause damage to the vehicle suspension, may cause sudden braking by drivers, and the like. Consequently, implementations herein are configured to detect debris early so that adjustments may be made to the vehicle travel to avoid the debris.

Some examples herein include a camera-based system for detecting small obstacles, fragments, rubbish, vehicle parts, and various other types of debris in a vehicle travel path. The debris detection information determined by the system herein may be used to assist or otherwise provide information to various vehicle control systems to enable the vehicle control systems to make vehicle control adjustments to avoid the debris, or otherwise adapt based on the detected debris. Further, the automated debris detection techniques, as described herein, may provide significant advantages for enabling ADAS and/or AD vehicle systems to improve the safety and driving comfort for vehicle occupants.

Furthermore, in some implementations, the system herein may also be used to detect potholes in the roadway to enable avoidance of the potholes. For example, by modifying the weights used by the classifier features discussed below, the system may detect holes in pavement in a manner similar to detecting debris extending upward on top of the pavement. Numerous other variations will be apparent to those of skill in the art having the benefit of the disclosure herein.

In some cases, information about the detected debris and the location of the debris may be uploaded to a server or other service computing device, and the debris information may subsequently be provided to other vehicles. Thus, by using the location information, the other vehicles are able to avoid routes or particular lanes in which debris have been detected, thereby avoiding possible damage to the other vehicles. In addition, the debris detection information uploaded to the service computing device may be used by road management crews, or the like, to locate and remove debris for clearing the road surface more quickly. Accordingly, a debris detection system, as described herein, is able to accurately detect debris using only one or more cameras as sensors, and is able to provide significant benefits for improving vehicle safety, preventing vehicle damage, and improving the comfort of vehicle occupants.

For discussion purposes, some example implementations are described in the environment of capturing and analyzing images for detecting debris in a travel path of a vehicle. However, implementations herein are not limited to the particular examples provided, and may be extended to other types of cameras, other types of sensing devices, other types of vehicles, other types of obstacles, other types of debris, other types of low visibility hazards, such as potholes, and so forth, as will be apparent to those of skill in the art in light of the disclosure herein.

FIG. 1 illustrates an example debris detection system 100 configured for detecting debris in the path of a vehicle 102 according to some implementations. In this example, the vehicle 102 is traveling on a roadway or other travel path 104 in a direction indicated by arrow 106. The debris detection system 100 herein may include at least one camera system 108, which may be mounted on the vehicle 102. In the illustrated example, the camera system 108 may include a stereo camera, but in other examples, the camera system 108 may include, e.g., a mono camera or multiple mono and/or stereo cameras. The camera field of view 110 may be wide enough to capture the road or other travel path 104 in front of the vehicle 102. In some cases, the camera system 108 may capture images of the field of view 110 continually, e.g., 15 frames per second, 30 frames per second, 60 frames per second, or any other desired frequency that provides images at a high enough rate to enable identification of debris 112 in the travel path 104 in time to take evasive action or otherwise adapt to the debris 112. Further, in some examples, the image capturing frequency of the camera system 108 may increase as the vehicle speed increases.

The vehicle 102 may include one or more vehicle computing devices 114, as discussed additionally below. The vehicle computing device(s) 114 may execute a debris detection program 116 and a vehicle control program 118. In some cases, the debris detection program 116 may receive the images captured by the camera(s) of the camera system 108 and may perform analysis on the images to determine whether debris 112 is in the current travel path 104 of the vehicle 102. The debris detection program 116 may provide debris information about detected debris 112 to the vehicle control program 118 which may initiate one or more actions based on the debris information, such as warning a driver, braking the vehicle 102, steering the vehicle 102, or the like.

In some cases, the camera system 108 may include at least one vehicle computing device 114 that executes the debris detection program 116. In other cases, the vehicle computing device(s) 114 may be separate from the camera system 108, and located elsewhere in the vehicle 102 may execute the debris detection program 116. In either case, the vehicle computing device(s) 114 may receive images from the camera system 108 and may analyze the images to detect the debris 112.

In some examples, the debris detection program 116 may generate a parallax map from the received images, e.g., using mono camera images, stereo camera images, or images taken from multiple cameras. In the case that a mono camera is used, a depth map may be calculated using a trained machine learning model. For instance, initially, a set of monocular images and their corresponding ground-truth parallax maps may be captured and used for training the machine learning model. Subsequently, the machine learning model may be used to predict approximate values of the parallax map as a function of newly captured images.

Alternatively, in case of a stereo camera or multiple cameras, images may be captured by two or more than two cameras. The captured images may be used to calculate a parallax using block matching techniques, such as semi-global block matching or any other suitable technique. In some examples herein, a stereo camera system is used as an example system to explain some example implementations, but those of skill in the art will understand that similar arrangements and techniques may be applied using systems having a single mono camera or multiple mono cameras as well.

At least a portion of FIGS. 2-4, 7, 9-11, 19 and 20 include flow diagrams illustrating example algorithms or other processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 2:
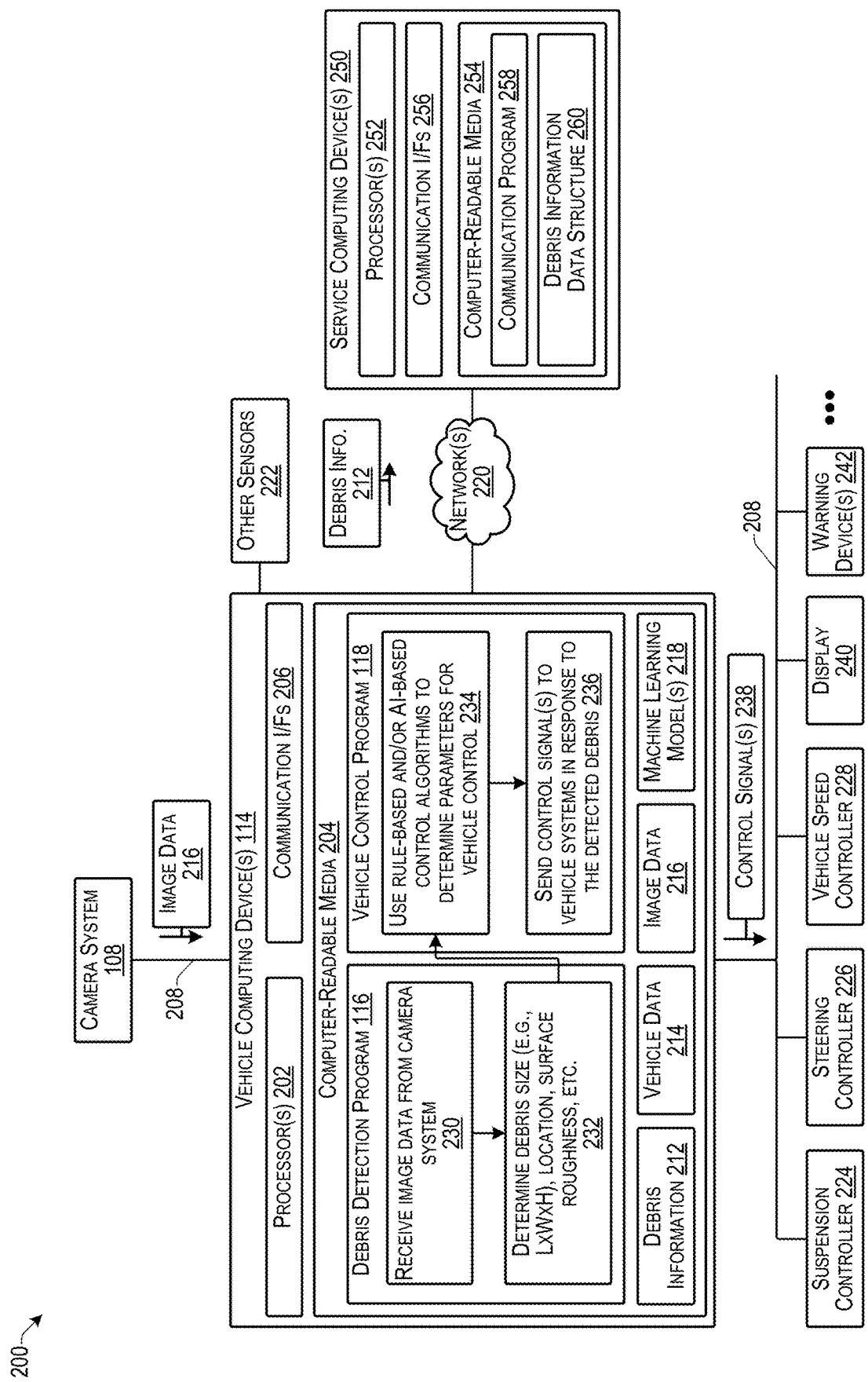
FIG. 2 illustrates an example architecture of a debris detection and vehicle control system that may be included in the vehicle according to some implementations.

FIG. 2 illustrates an example architecture of a debris detection and vehicle control system 200 that may be included in the vehicle 102 according to some implementations. Each vehicle computing device 114 may include one or more processors 202, one or more computer-readable media 204, and one or more communication interfaces (I/Fs) 206. In some examples, the vehicle computing device(s) 114 may include one or more ECUs (electronic control units) or any of various other types of computing devices. For instance, the computing device(s) 114 may include one or more ADAS/AD ECUs for controlling critical vehicle systems to perform ADAS and/or AD tasks, such as navigation, braking, steering, acceleration, deceleration, and so forth. The computing device(s) 114 may also include other ECUs for controlling other vehicle systems.

ECU is a generic term for any embedded system that controls one or more of the systems, subsystems, or components in a vehicle. Software, such as the debris detection program 116 and the vehicle control program 118 may be executed by one or more ECUs and may be stored in a portion of the computer-readable media 204 (e.g., program ROM) associated with the respective ECU to enable the ECU to operate as an embedded system. ECUs may typically communicate with each other over a vehicle bus 208 according to a vehicle bus protocol. As an example, the Controller Area Network bus (CAN bus) protocol is a vehicle bus protocol that allows ECUs and other vehicle devices and systems to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 114 may include one or more processors 202, which may include one or more of central processing units (CPUs), graphics processing units (GPUs), microprocessors, microcomputers, microcontrollers, digital signal processors, state machines, logic circuits, and/or any devices that manipulate signals based on operational instructions. As one example, the processor(s) 202 may include one or more hardware processors and/or logic circuits of any suitable type specifically programmed or configured to execute the algorithms and other processes described herein. The processor(s) 202 may be configured to fetch and execute computer-readable instructions stored in the computer-readable media 204, which may program the processor(s) 202 to perform the functions described herein.

The computer-readable media 204 may include volatile and nonvolatile memory and/or removable and non-removable media implemented in any type of technology for storage of information, such as computer-readable instructions, data structures, programs, program modules, and other code or data. For example, the computer-readable media 204 may include, but is not limited to, RAM, ROM, EEPROM, flash memory or other memory technology, optical storage, solid state storage, magnetic disk, cloud storage, or any other medium that can be used to store the desired information and that can be accessed by a computing device. Depending on the configuration of the vehicle computing device(s) 114, the computer-readable media 204 may be a tangible non-transitory medium to the extent that, when mentioned, non-transitory computer-readable media exclude media such as energy, carrier signals, electromagnetic waves, and/or signals per se. In some cases, the computer-readable media 204 may be at the same location as the vehicle computing device 114, while in other examples, the computer-readable media 204 may be partially remote from the vehicle computing device 114.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the vehicle computing device 114. Functional components stored in the computer-readable media 204 may include the debris detection program 116 and the vehicle control program 118, each of which may include one or more computer programs, applications, executable code, or portions thereof. Further, while these programs are illustrated together in this example, during use, some or all of these programs may be executed on separate vehicle computing device(s) 114.

In addition, the computer-readable media 204 may store data, data structures, and other information used for performing the functions and services described herein. For example, the computer-readable media 204 may store debris information 212, vehicle data 214, image data 216, one or more machine learning models 218, and so forth. Further, while these data and data structures are illustrated together in this example, during use, some or all of these data and/or data structures may be stored on separate the computing device(s) 114. The computing device(s) 114 may also include or maintain other functional components and data, which may include programs, drivers, etc., and the data used or generated by the functional components. Further, the computing device(s) 114 may include many other logical, programmatic, and physical components, of which those described above are merely examples that are related to the discussion herein.

The one or more communication interfaces 206 may include one or more software and hardware components for enabling communication with various other devices, such as over the CAN bus 208 and/or over one or more network(s) 220. For example, the communication interface(s) 206 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, and the like, as additionally enumerated elsewhere herein.

The computing device(s) 114 may be able to communicate with the camera system 108 via the CAN bus 208, direct connection, or any other type of connection for receiving image data 216 from the camera system 108. For example, as discussed in detail below, the debris detection program may receive the image data 216 from the camera system 108, and may detect any debris present in the images. In the example, of FIG. 2, the received image information may be received as raw image data without any substantial processing. Alternatively, in other examples, as discussed additionally below, e.g., with respect to FIG. 3, the camera system 108 may perform the debris detection rather than sending the raw image data 216 to the vehicle computing device 114.

In addition, the computing device(s) 114 may receive vehicle data 214 from other systems and/or other sensors in the vehicle. For instance, the vehicle may include a plurality of other sensors 222 in addition to the camera system 108 that may provide sensor information used by the vehicle control program 118. Several non-exhaustive examples of other sensors may include radar, LIDAR, ultrasound, a global positioning system (GPS) receiver, other cameras, e.g., facing in other directions, and the like. In addition, the vehicle data 214 used by the vehicle control program 118 may include information received from or associated with various vehicle systems, such as from a suspension controller 224 associated with the suspension system, a steering controller 226 associated with the steering system, a vehicle speed controller 228 associated with a braking and acceleration system, and so forth.

As one example, as indicated at 230, the debris detection program 116 may receive the image data 216 from the camera system 108 continually, e.g., as the camera system 108 captures images of the travel path of the vehicle while the vehicle is in motion. Furthermore, at 232, the debris detection program 116 may determine debris size such as length, width and height of debris in the received images, the location of the debris, the surface roughness etc. The debris detection program 116 may provide debris information about any detected debris, such as size, location, etc., to the vehicle control program 118 which may take one or more actions in response to detection of debris.

For example, at 234, the vehicle control program 118 may use rule-based and or artificial intelligence based control algorithms to determine parameters for vehicle control. For instance, the vehicle control program 118 may apply one or more of the machine learning models 218 for determining an appropriate action, such as braking, steering, decelerating, or the like. Furthermore, as indicated at 236, the vehicle control program 118 may send one or more control signals 238 to one or more vehicle systems in response to the detected debris. For example, the vehicle control program 118 may send control signals 238 to the suspension controller 224, the steering controller 226, and/or the vehicle speed controller 228. For instance, the control signals 238 may include a specified spring coefficient and/or damping control information sent to the suspension controller 224; specified steering angle sent to the steering controller 226; and/or specified braking control information or deceleration control information sent to the vehicle speed controller 228.

In addition, or alternatively, such as in the case that the vehicle is under control of a driver human driver, the vehicle control program 118 may send a control signal 238 to a display 240 to present an alert and/or to one or more warning devices 242 such as an audible or visual warning device. Examples of warning devices 242 include speakers that may generate an audible alert, haptic devices that may generate a vibration or other type of tactile alert (e.g., in a seat or steering wheel), and/or a visual signaling device that may generate a visual alert.

In addition, the debris detection program 116 may also be configured to provide the debris information 212 over the one or more networks 220 to one or more service computing devices 250. The service computing device(s) 250 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 250 as being present in a single location, these components and data may alternatively be distributed across different computing devices and different locations in any manner. Consequently, the functions may be implemented by one or more service computing devices, with the various functionality described herein distributed in various ways across the different computing devices. Multiple service computing devices 250 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 250 may include one or more processors 252, one or more computer-readable media 254, and one or more communication interfaces 256. Each processor 252 may be a single processing unit or a number of processing units, and may include single or multiple computing units or multiple processing cores. The processor(s) 252 can be implemented as one or more microprocessors, microcomputers, microcontrollers, digital signal processors, central processing units, state machines, logic circuitries, and/or any devices that manipulate signals based on operational instructions. For instance, the processor(s) 252 may be one or more hardware processors and/or logic circuits of any suitable type specifically programmed or configured to execute the algorithms and processes described herein. The processor(s) 252 can be configured to fetch and execute computer-readable instructions stored in the computer-readable media 254, which can program the processor(s) 252 to perform the functions described herein.

The computer-readable media 254 may include volatile and nonvolatile memory and/or removable and non-removable media implemented in any type of technology for storage of information, such as computer-readable instructions, data structures, program modules, or other data. Such computer-readable media 254 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 250, the computer-readable media 254 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 254 may be used to store any number of functional components that are executable by the processors 252. In many implementations, these functional components comprise instructions or programs that are executable by the processors 252 and that, when executed, specifically configure the one or more processors 252 to perform the actions attributed above to the service computing device 250. Functional components stored in the computer-readable media 254 may include a communication program 258 that may be executed to configure the service computing device 250 to receive and store debris information in a debris information data structure 260. In addition, the communication program 258 may further configure the service computing device 252 retrieve debris information from the debris information data structure 260 and send the debris information to another vehicle that will be traveling on the travel path on which debris has been detected.

Additionally, or alternatively, the communication program 258 may provide the debris information in the debris information data structure 260 to a road maintenance crew or the like who will be clearing debris from road locations where debris has been identified. In some examples, the service computing device 250 may receive debris information 212 from a plurality of vehicles that traverse the same travel path, and may aggregate the debris information from a plurality of vehicles to more accurately identify the particular location of the detected debris, as well as the size and shape of the detected debris.

In addition, the computer-readable media 254 may store data used for performing the operations described herein. Thus, the computer-readable media 254 may include the debris information data structure 260 as discussed above. Further, the service computing device 250 may also include or maintain other functional components and data not specifically shown in FIG. 2, which may include programs, drivers, etc., and the data used or generated by the functional components. Additionally, the service computing device 250 may include many other logical, programmatic, and physical components, of which those described above are merely examples that are related to the discussion herein.

Further, while FIG. 2 illustrates the components and data of the service computing device(s) 250 as being present in a single location, these components and data may alternatively be distributed across different computing devices and different locations in any manner. Consequently, the functions may be implemented by one or more computing devices, with the various functionality described above distributed in various ways across the different computing devices.

The communication interface(s) 256 may include one or more interfaces and hardware components for enabling communication with various other devices, such as over the network(s) 220. For example, communication interface(s) 256 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The one or more networks 220 may include any appropriate network, including a wireless network, such as a cellular network; a wide area network, such as the Internet; a local area network, such an intranet; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail.

Figure 3:
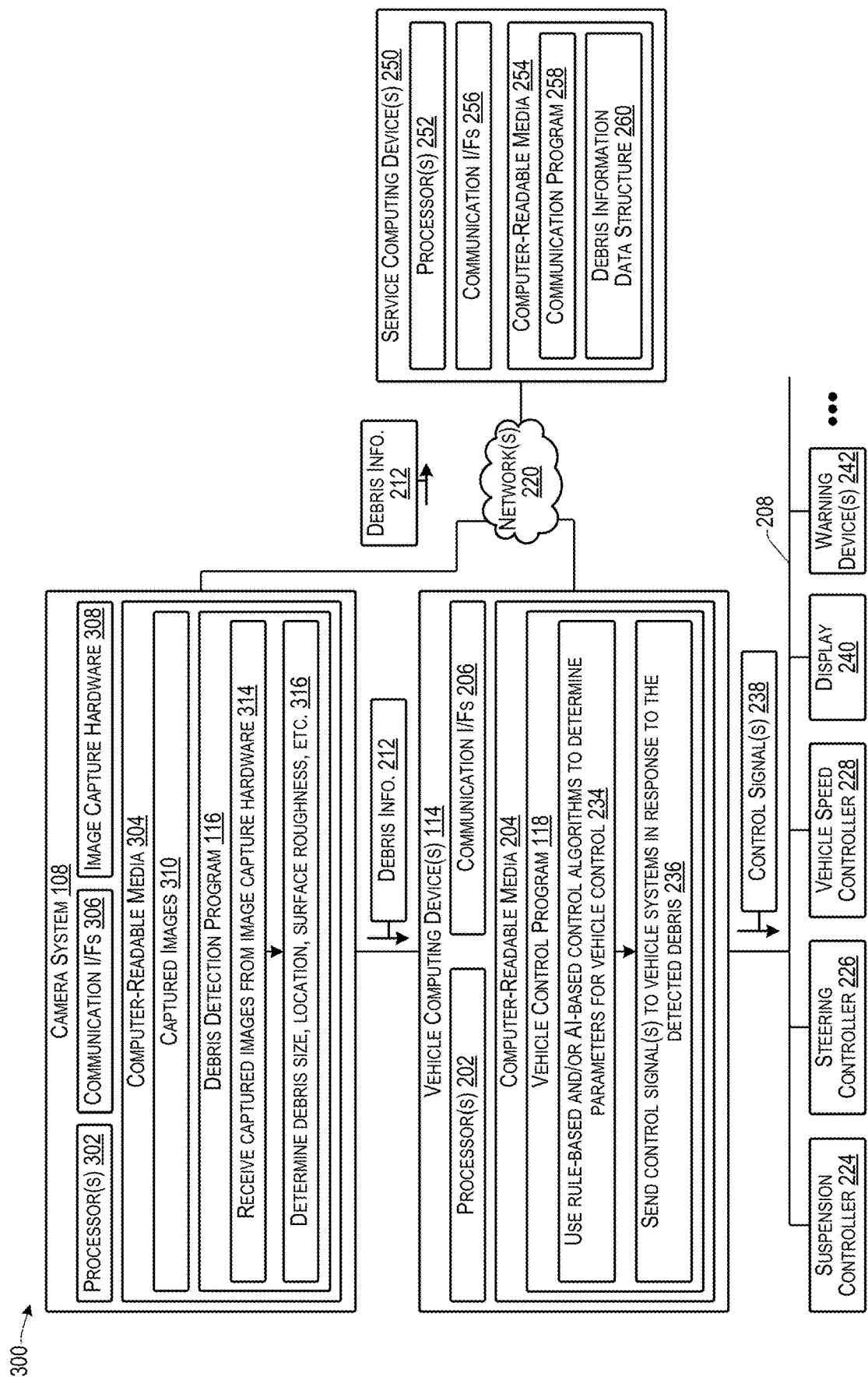
FIG. 3 illustrates an example architecture of a debris detection and vehicle control system that may be included in the vehicle according to some implementations.

FIG. 3 illustrates an example architecture of a debris detection and vehicle control system 300 that may be included in the vehicle 102 according to some implementations. In this example, the camera system 108 may include processing capability for determining debris information 212 independently of the vehicle computing devices 114. Accordingly, the camera system 180 includes one or more processors 302, one or more computer readable media 304, and or more communication interfaces 306. The one or more processors 302 may be or may include any of the processors 202 discussed above with respect to FIG. 2, or other suitable processors for performing the operations described herein. Furthermore, the one or more computer readable media 302 may be or may include any of the computer readable media 204 discussed above with respect to FIG. 2, or other suitable computer readable media. Similarly, the communication interfaces 306 may be or may include any of the communication interfaces 206 discussed above with respect to FIG. 2 or other suitable communication interfaces.

In addition, the camera system 108 includes image capture hardware 308, which may include one or more lenses, one or more focusing systems, and one or more image sensors, as is known in the art. In this example, the camera system 108 may execute the debris detection program 116 on the one or more processors 302. Accordingly, the image capture hardware 308 may capture images in the field of view of the camera system 108, and may store the captured images 310 to the computer readable media 304.

At 314, the debris detection program 116 receives the captured images from the image capture hardware. For example, the debris detection program 116 may continually receive captured images 310 from the image capture hardware 308 as the images are captured. At 316, the debris detection program 116 may determine debris size location service rep this etc. as described in additional detail below. The debris detection program 116 may then send debris information 212 or any identify debris to the vehicle computing devices 114. The vehicle control program 118 may then process the debris information for controlling the vehicle as discussed above with respect to FIG. 2 and as discussed additionally below. In addition, at least one of the debris detection program 116 or the vehicle control program 118 may send the debris information 212 via the network(s) 220 to the service computing device 250 for storage in the debris information data structure 260.

Figure 4:
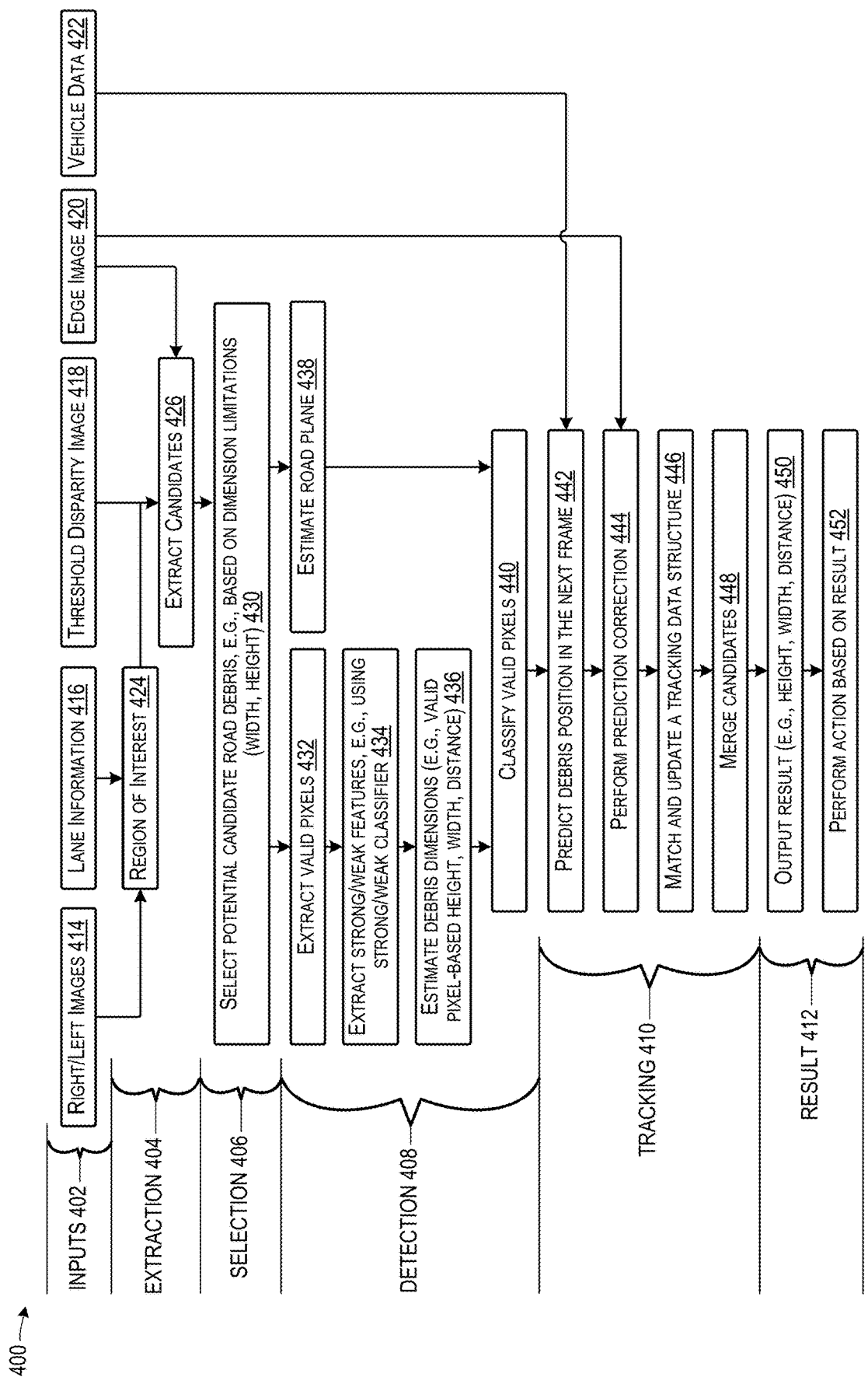
FIG. 4 is a flow diagram illustrating an example process setting forth an algorithm for detecting debris that may be executed by the systems discussed above according to some implementations.

FIG. 4 is a flow diagram illustrating an example process 400 setting forth an algorithm for detecting debris that may be executed by the systems 200, 300 discussed above according to some implementations. In some examples, the process 400 may be executed by the system 200 or 300 discussed above by execution of the debris detection program 116. In the illustrated example, the process 400 includes receiving inputs 402, performing extraction 404, performing selection 406, performing detection 408, performing tracking 410, and applying results 412. For instance, initially, a parallax and/or disparity may be calculated, e.g., from images taken by the stereo camera system 108 or the like. A region of interest (ROI) in the image(s) may be detected, which may include a road surface that may contain, small obstacles or other debris and debris candidates may be extracted from the image(s). From the initial extracted candidates, potential candidates are selected based on applying control decision logic. The selected potential candidates may be classified using a valid-pixel-based strong-weak-feature-based classifier. Further a tracking technique is performed to predict the debris location in the next image frame for tracking and location purposes. In addition, a result of the process 400 may be used by the system 200, 300 to perform at least one action based on the result.

In this example, the received inputs 402 may include images that are received from the camera system 108 discussed above, as well as other inputs. Examples of inputs 402 may include left and/or right images 414, which may be received from the camera system 108, lane information 416, a threshold disparity image 418, an edge image 420, and vehicle data 422. The lane information 416, threshold disparity image 418, and edge image 420 may be determined as discussed additionally below.

During extraction 404, a region of interest (ROI) 424 may be determined from the left/right images 414 and the lane information 416. In addition, at 426, the process may extract candidates as potential debris based on the region of interest 424, the threshold disparity image 418, and the edge image 420. During selection 406, as indicated at 430, the process may select candidate row debris e.g., based on dimension limitations such as with and height limitations.

During detection 408, as indicated at 432, the process may extract valid pixels from the selected potential candidate road debris, and at 434, the process may extract strong and/or weak features, such as using a strong/week classifier as discussed additionally below. At 436, the process may estimate debris dimensions such as based on valid pixel based height width and distance. In addition, at 438, the process may estimate the road plane. At 440, based on the estimated road plane 438, and the estimated debris dimensions, the process may classify valid pixels.

During the tracking 410, the process includes predicting debris position in the next frame at 442 based on the classified valid pixels and further based on the vehicle data 422. In addition, the process may perform prediction correction at 444 based on the predicted debris position in the next frame and the edge image 420. Following prediction correction, at 446, the process may match and update a tracking data structure, and at 448, may merge candidates for determining the debris. When applying the results 412, the process may output the results such as height width and distance of the debris, as indicated at 450, and may perform at least one action based on the results as indicated at 452. Each of the stages 402-412 of process 400 is discussed in additional detail below.

Figure 5:
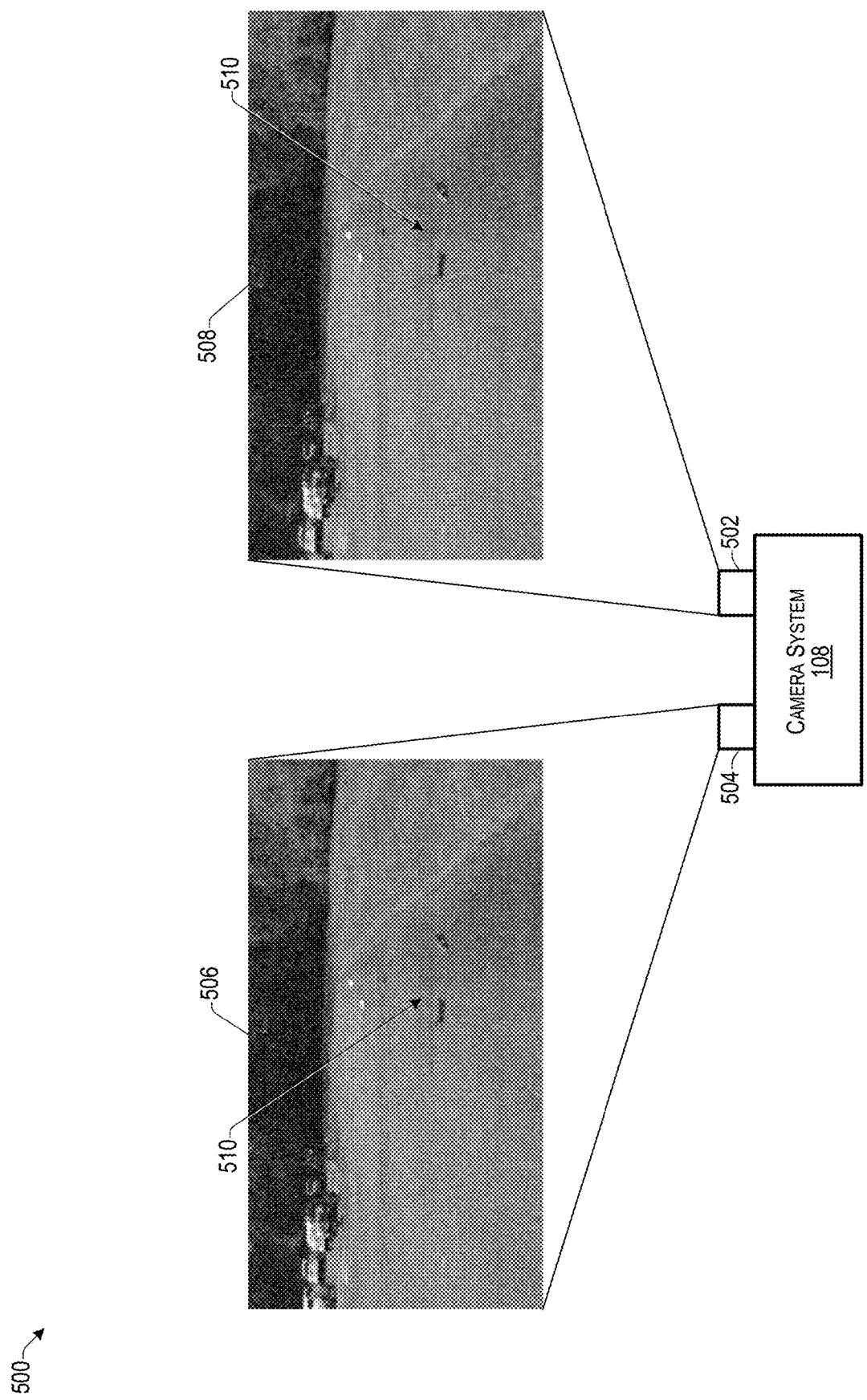
FIG. 5 illustrates an example of capturing left and right images using the camera system 108 according to some implementations.

FIG. 5 illustrates an example 500 of capturing left and right images using the camera system 108 according to some implementations. In this example, the camera system 108 may include a stereo camera that includes two cameras, e.g., a right camera 502 and a left camera 504. The right and left cameras, 502 and 504 are fixed with respect to each other and are positioned to observe the same scene with two different angles of view. Accordingly, the camera system 108 may capture a left image 506 and a right image 508, each of which may include the same debris 510 in the respective image 506, 508. Furthermore, while a stereo camera is employed in some implementations herein, in other examples, a mono camera may be used instead, as will be apparent to those of skill in the art having the benefit of the disclosure herein. For example, the mono camera may be used with one of the machine learning models 218 to determine a distance of any point in an image from the camera based on receipt of sequential images and/or based on receiving a current speed of the vehicle.

Figure 6:
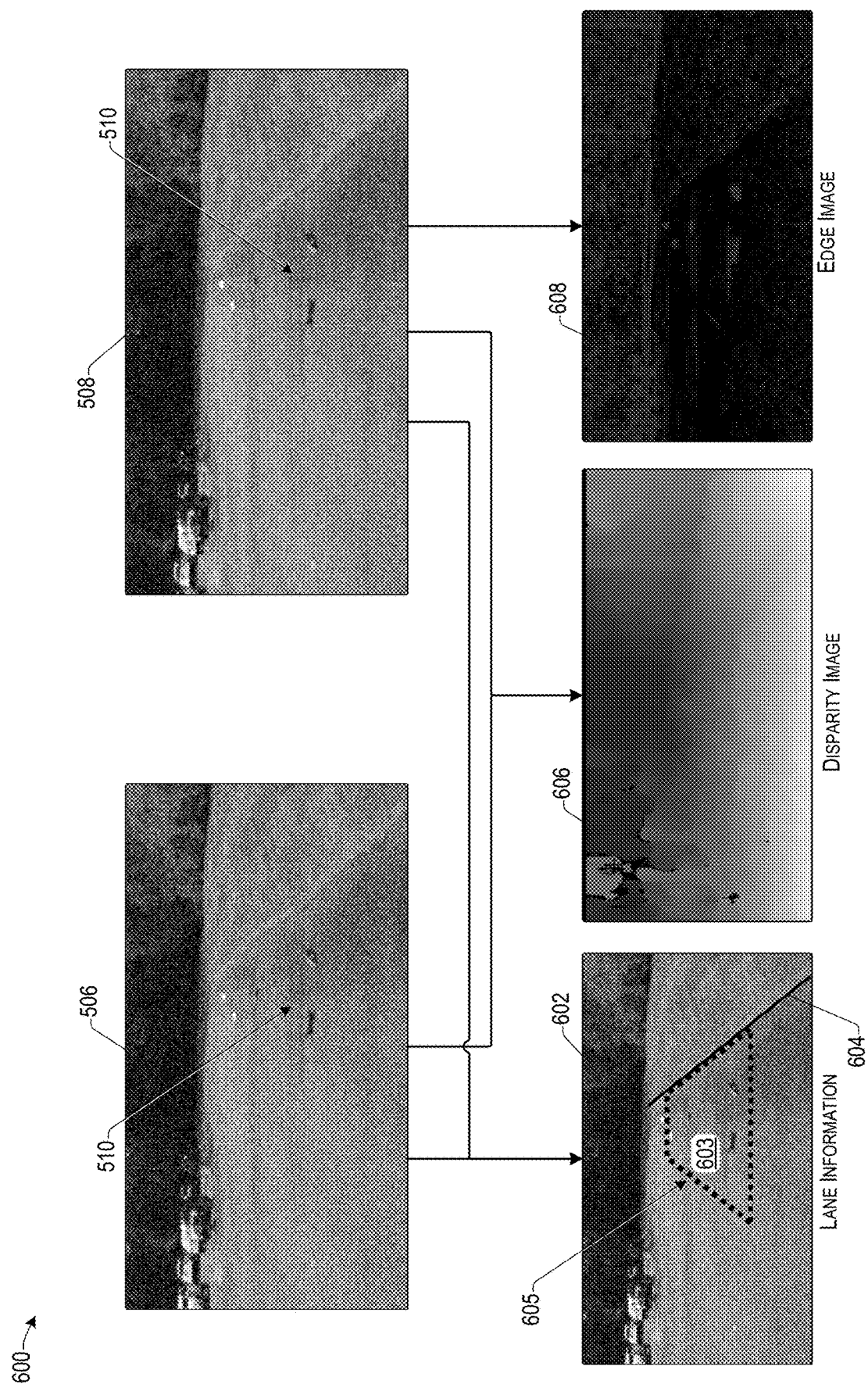
FIG. 6 illustrates an example of determining lane information, a disparity image, and an edge image according to some implementations.

FIG. 6 illustrates an example 600 of determining lane information, a disparity image, and an edge image according to some implementations. For example, based on the received left and right images 506 and 508, the system may execute the debris detection program 116 to generate additional images such as a lane information image 602 that includes lane information as indicated by a line 604. In some cases, road markers, a road edge, a road size information, or the like, may be used to determine the lane information 604.

Further, based on the lane information, a region of interest (ROI) 603 may be determined, as indicated by dashed line 605. For instance, the ROI 603 may be determined based on specified distances from the camera, which may be default distance. In some cases, the specified distances may be adjusted based on the speed of the vehicle, e.g., by increasing the specified distances as the vehicle speed increases and decreasing the specified distances as the vehicle speed decreases.

In some cases, when detecting the ROI 603, road edge and/or lane marker detection may be performed at rows of pixels corresponding to every few meters or fractions of meters on the received image 602 for calculating the left and right lane boundaries at every pixel row of the entire image 602. The specified range distance for detection of an upper boundary and a lower boundary of the ROI 603 may be applied to the lane information image 602 for determining the region of interest 603. As several nonlimiting examples, the lower range may be 3 to 10 meters and the upper range may be 30-50 meters for specifying the ROI 603, while the left and right boundaries may correspond to the lane boundaries. After the ROI 603 has been determined, debris candidates inside the ROI 603 may be detected, while those outside the ROI 603 may be ignored. In particular, in some examples, to help make the overall process suitable for real-time processing, the input images (e.g., the edge image, the disparity map image and the threshold disparity image may be processed only for the ROI, thus avoiding additional processing time for other portions of these images. Thus, in some implementations, pixels of the edge image and threshold disparity image may be extracted only if those pixels belong to the detected ROI 603.

In addition, the system may use the left and right images 506 and 508 to determine a parallax image which is referred to as a disparity map image 606. For instance, the system may calculate the disparity map image 606 using the two stereo left and right images 506 and 508 based on a block matching method. As one example, as is known in the art, if a point $P_L=(u1, v1)$ in the left image 506, the corresponding point $P_R=(u2, v2)$ in the right image 508 may be at the same height as $P_L$, i.e., v1=v2 as measured from a common baseline. Thus, the parallax measurement can be determined using a simple stereo camera theory in which the parallax may be defined as:

$$d=u2-u1 \qquad \text{EQ(1)}$$

Based on the determined parallax, implementations herein may determine the disparity image 606 by determining the depth information of a 3D point from the parallax since the disparity is inversely proportional to the corresponding parallax. Accordingly, the depth may be calculated using left and right images and the actual disparity, e.g.:

$$Z=fb/d \qquad \text{EQ(2)}$$

where Z is the distance (depth) along the camera axis, f is the focal length in pixels, b is a baseline in meters, and d is the disparity in pixels.

Furthermore, the edge image 608 may be determined from at least one of the left or right images 506 or 508 using any of various edge detection techniques known in the art. For instance, in this example, the edge image 608 may be determined from the right image 508, and may indicate edges identified within the right image 508. For instance, the edge information determined for the edge image 608 may help determine how much noise to remove from the disparity image 606 during subsequent processing as discussed additionally below.

Figure 7:
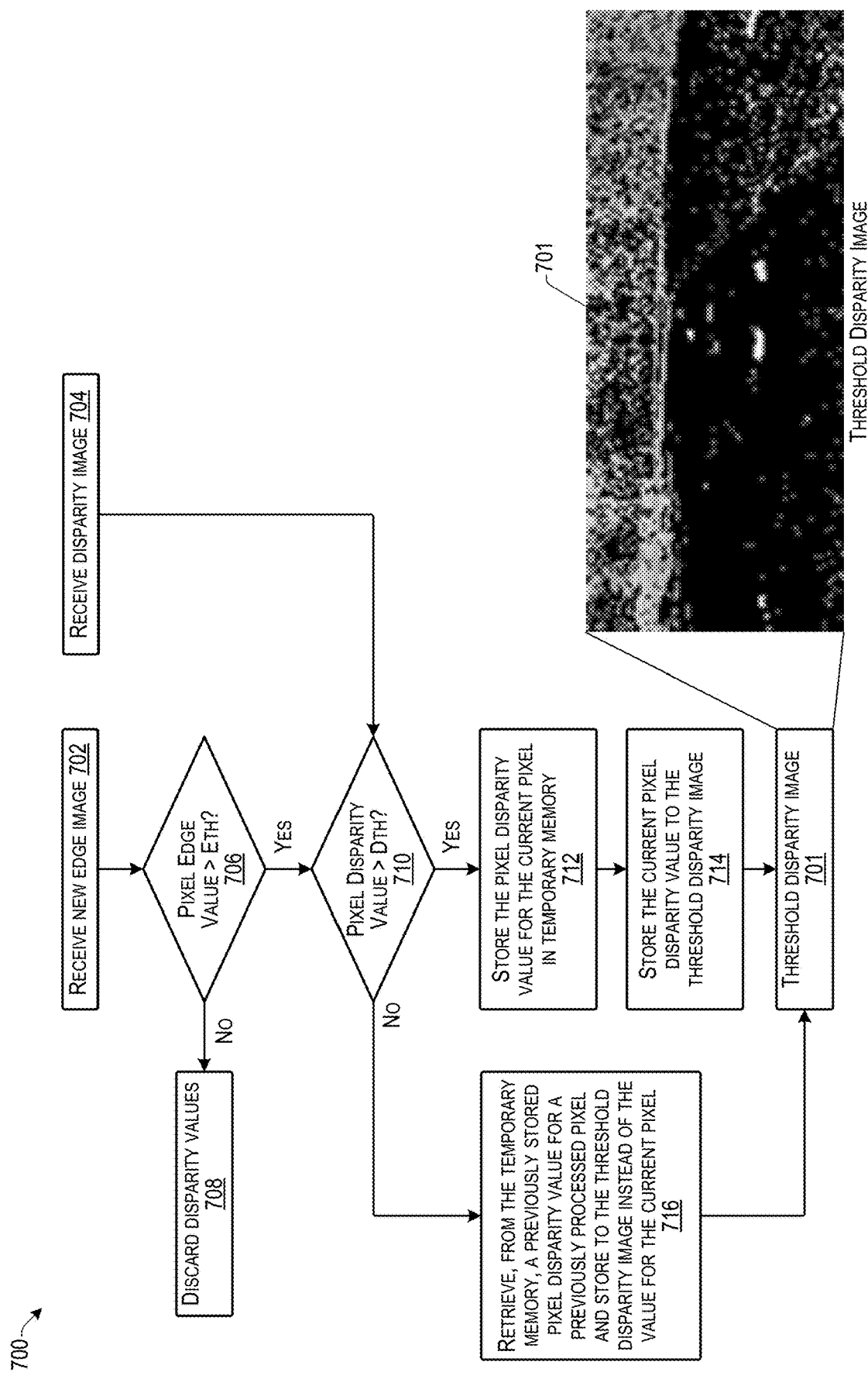
FIG. 7 is a flow diagram illustrating an example process for generating a threshold disparity image according to some implementations.

FIG. 7 is a flow diagram illustrating an example process 700 for generating a threshold disparity image 701 according to some implementations. In some examples, the process 700 may be executed by the system 200 or 300 discussed above by execution of the debris detection program 116. For instance, after calculating the disparity image 608 discussed above with respect to FIG. 6, the system may use the edge image 610 to remove pixels with invalid disparity values from the disparity image to obtain a threshold disparity image. For instance, the amount of edge information in the edge image 610 may control how much noise to remove from the disparity image and/or how much disparity information to include in the threshold disparity image.

At 702, the system receives a newly determined edge image and, at 704, the system receives a newly determined disparity image. For instance, the edge image and the disparity image may be determined as discussed above with respect to FIG. 6.

At 706, the system may determine, for each pixel in the edge image, whether a selected current pixel's edge value is greater than an edge threshold $E_{TH}$. If not, then the process goes to 708. If so, the process goes to 710. As one example, the edge threshold $E_{TH}$ may be derived using statistical analysis on large sets of image data. For instance, the image data may cover various scenarios such as different road surface conditions (e.g., different road surface color, such as asphalt or concrete and so forth), weather conditions, time of the day, and the like. Further, the edge threshold $E_{TH}$ may be updated based on weather and road surface conditions.

At 708, when the pixel's edge value is not greater than the edge threshold $E_{TH}$, the system may discard the disparity value for that pixel.

At 710, when the pixel's edge value is greater than the edge threshold $E_{TH}$, the system may determine whether the current pixel's disparity value is greater than a disparity threshold $D_{TH}$. As one example, the disparity threshold $D_{TH}$ may be derived using statistical analysis on large sets of image data. For instance, the image data may cover various scenarios such as different road surface conditions (e.g., different road surface color, such as asphalt or concrete and so forth), weather conditions, time of the day, and the like. Further, the disparity threshold $D_{TH}$ may be updated based on weather and road surface conditions. The system may determine the disparity value from the corresponding pixel location in the disparity image received at 704. If the pixel's disparity value is not greater than the disparity threshold $D_{TH}$, the process goes to 716. If the pixel's disparity value is greater than the disparity threshold $D_{TH}$, the process goes to 712.

At 712, when the current pixel's disparity value is greater than the disparity threshold $D_{TH}$, the system may store the pixel disparity value for the current pixel in a temporary memory location.

At 714, the system may store the current pixel's disparity value to the threshold disparity image 701.

At 716, when the pixel's disparity value is not greater than the disparity threshold $D_{TH}$, the system may retrieve, from the temporary memory location, a previously stored pixel disparity value for a previously processed pixel (e.g., an adjacent pixel) and store the retrieved pixel disparity value to the threshold disparity image 701 instead of the disparity value for the current pixel.

Figure 8:
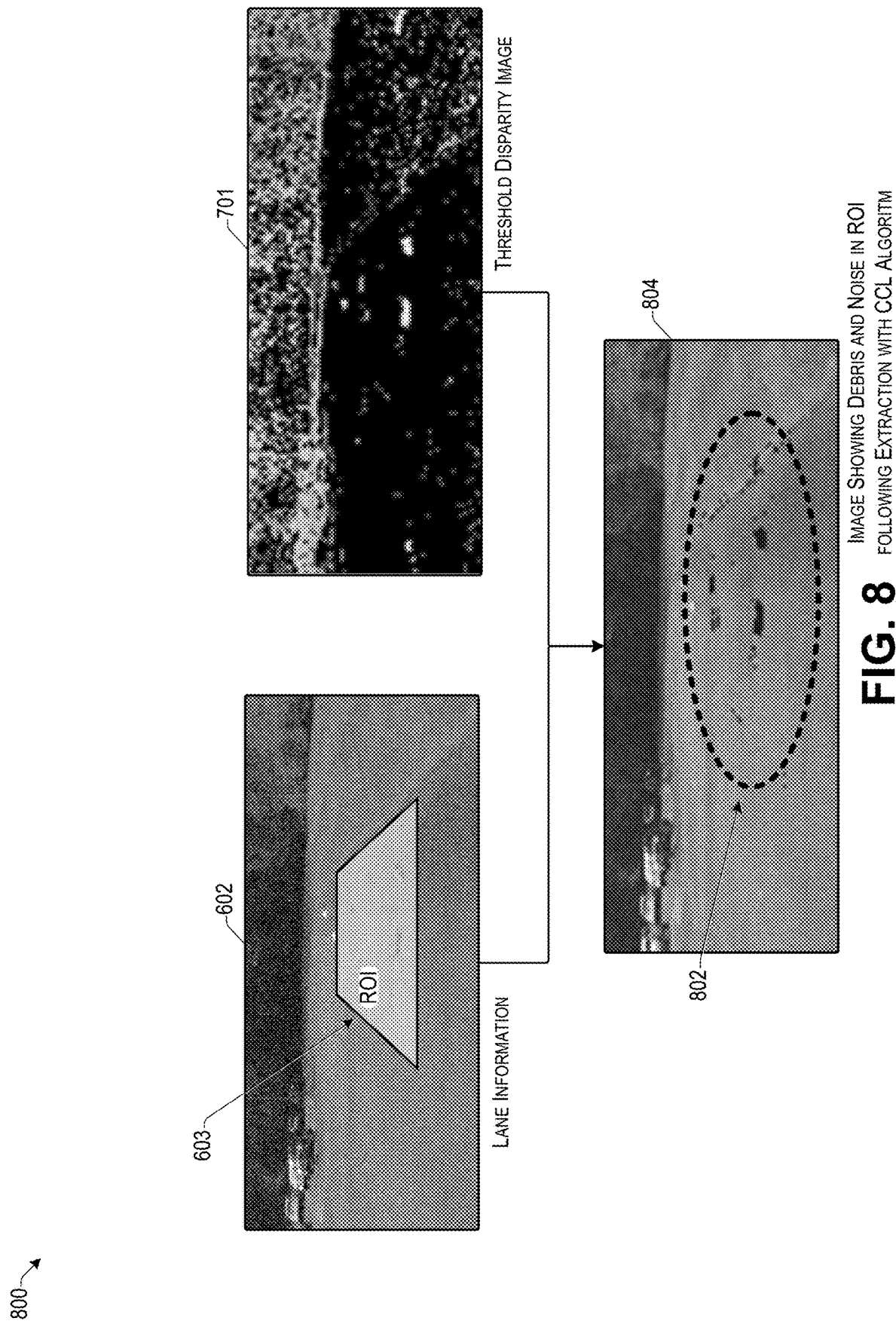
FIG. 8 illustrates an example of determining debris candidates and noise by performing candidate extraction according to some implementations.

FIG. 8 illustrates an example 800 of determining debris candidates and noise by performing candidate extraction according to some implementations. In this example, following determination of the ROI 603 and the threshold disparity image 701, some examples herein may employ a connected component labeling (CCL) algorithm to extract the debris candidates and noise from the threshold disparity image 701 in the ROI 603. For example, as is known in the art, a CCL algorithm may include detecting connected regions in a digital image. In particular, the CCL algorithm may identify and extract connected blobs of pixels that are distinguishable from surrounding pixels, such as based on a difference in light/dark values. As a result of the extraction using the CCL algorithm, candidate debris and noise may be identified in the ROI, as indicated inside the dashed circle 802 in image 804. As discussed below with respect to FIG. 9, the extracted noise may subsequently be separated from the debris candidates using control decision logic.

Figure 9:
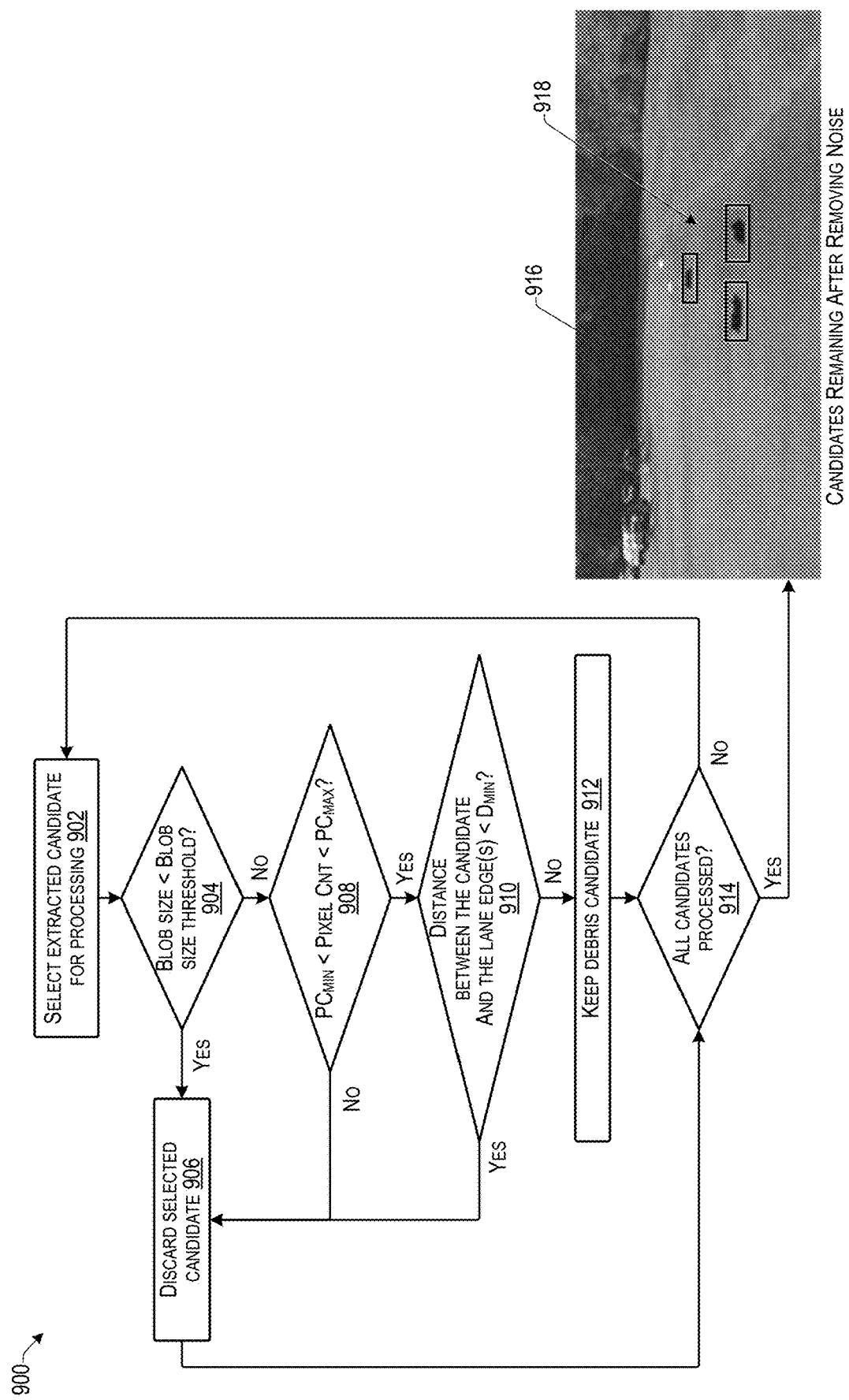
FIG. 9 is a flow diagram illustrating an example process for separating noise from debris candidates according to some implementations.

FIG. 9 is a flow diagram illustrating an example process 900 for separating noise from debris candidates according to some implementations. The process 900 may be performed by the system 200 or 300 executing the debris detection program 116.

At 902, the system may select one of the extracted candidates for processing. For instance, as discussed above, the CCL algorithm may extract a plurality of blobs from the disparity image 701 in the ROI 603. Each of the extracted blobs may be processed to determine whether to discard the blob or to retain the blob as a debris candidate.

At 904, the system may determine whether the blob size is less than a blob size special. For example, the blob may be required to meet a minimum height and width requirement, such as in centimeters, so that objects smaller than a specified size may be ignored. Furthermore, the blob size threshold may be variable based on an estimated distance of the blob from the camera. For instance, a blob of that is estimated to be further away from the camera, e.g., 40 meters, may have a smaller blob size threshold than a blob that is estimated to be closer to the camera, e.g., 20 meters. If the blob size is less than the blob size threshold, the process goes at 906. If not, the process goes to 908.

At 906, the selected candidate is discarded and the process goes to 914 to determine whether all candidates have been processed.

At 908, when the blob size is equal to or exceeds the blob size threshold, the system may determine whether the pixel count of the selected candidate is greater than a minimum pixel count threshold $PC_{MIN}$ and less than a maximum pixel count threshold $PC_{MAX}$. For example, if the number of pixels in the blob is less than the minimum threshold $PC_{MIN}$, then the candidate blob may be considered too small to be considered as debris. Further, if the number of pixels in the blob is greater than the maximum threshold $PC_{MAX}$, then the blob may be considered to not be debris at all, and an obstacle detection algorithm, or the like, may be relied on to avoid collision with the obstacle. Accordingly, this step may remove small noise along with large noisy candidates. In addition, similar to the blob size detection step 904 discussed, the pixel count thresholds may be dependent on the distance of the blob from the camera. For instance, a blob that is farther from the camera may have smaller minimum and maximum pixel count thresholds than a blob that is closer to the camera. If the selected candidate is between the minimum pixel count threshold and the maximum pixel count threshold, the process goes to 910. Otherwise, the process goes to 906 to discard the selected candidate.

At 910, the system may determine whether the distance between the selected candidate and the lane edges is less than a minimum distance $D_{MIN}$. For example, candidates on the side of the road are not likely to pose a threat to the vehicle and accordingly may be ignored. If the distance between the candidate and the lane edge(s) is less than the minimum distance then the process goes to 906 to discard the selected candidate. Otherwise, the process goes to 912.

At 912, the selected candidate is retained because the selected candidates has been determined to exceed the blob size threshold, to have a pixel count between the minimum and maximum pixel counts, and to be greater than the minimum distance from the edge of the road.

At 914 the system may determine whether all candidates have been processed. If not, the process returns to 902 to select the next candidate for processing. If so, then the candidates remaining may correspond to three candidates indicated in the image 916 within rectangles 918 after removing the noise. Furthermore, in other examples, not all of the blocks of process 900 are performed. For instance, only one of operations 904, 908, or 910 might be performed in some examples to improve real time processing speed.

Figure 10:
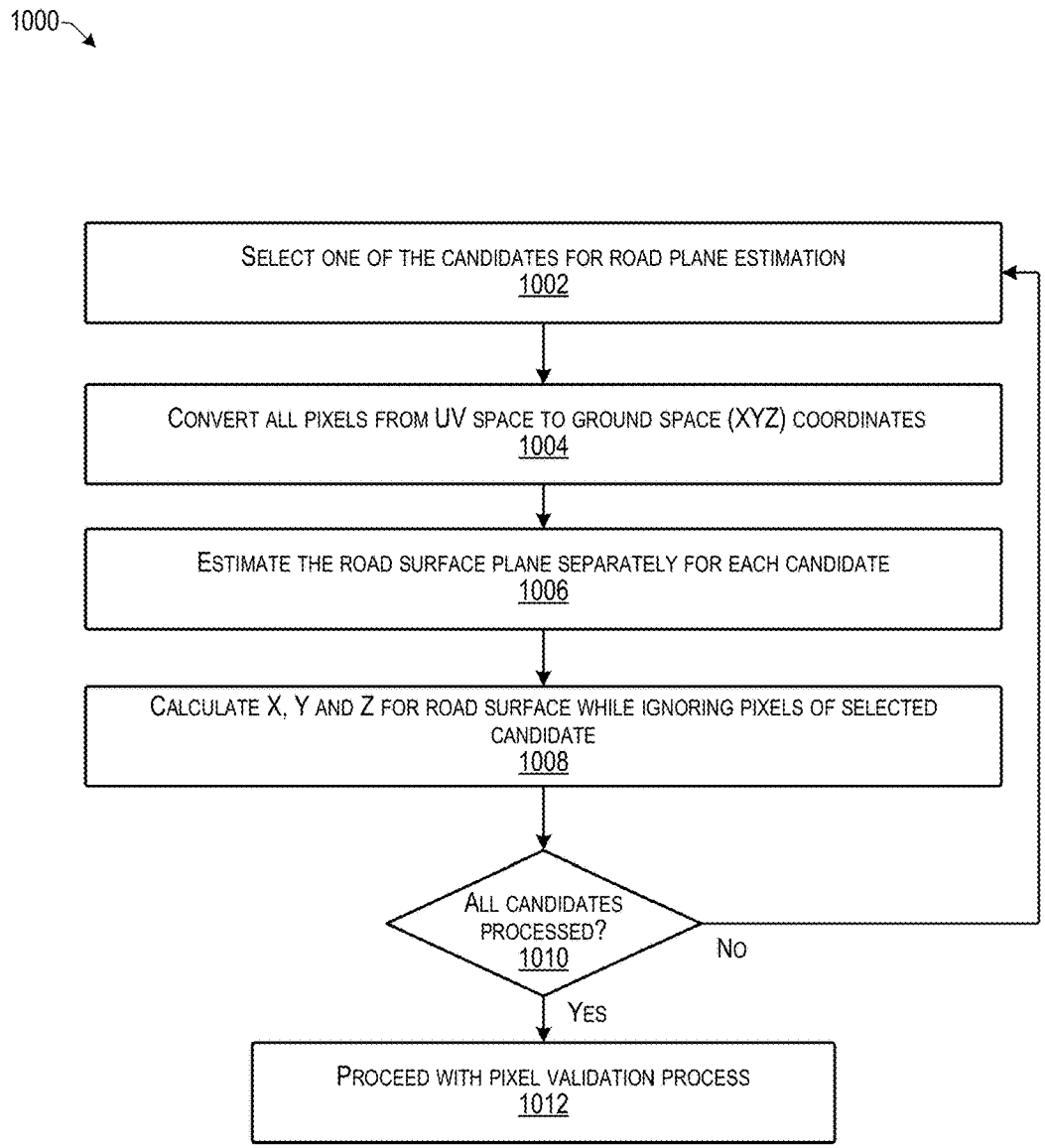
FIG. 10 is a flow diagram illustrating an example process for estimating the road surface plane according to some implementations.

FIG. 10 is a flow diagram illustrating an example process 1000 for estimating the road surface plane according to some implementations. For example, after one or more candidates are selected, as discussed above with respect to FIG. 5-9, the system may analyze the data of each candidate and may extract unique features to distinguish between debris and all other candidates (such as the road surface). Subsequently, each candidate may be classified as debris or non-debris based on the extracted features. The detection phase may be divided into three parts, namely, pixel validation, feature extraction, and classification using a strong/weak feature-based classifier.

Before pixel validation and the other detection operations are performed, however, implementations herein may perform a road surface plane estimation to estimate the road plane and calculate the X, Y and Z (real-world coordinate values) for each pixel using the disparity map image discussed above. Each candidate may be considered individually and all pixels may be converted from the UV coordinate space to ground space (XYZ) coordinates. The system may then estimate the road surface plane separately for each debris candidate, and may calculate X, Y and Z with respect to the estimated road surface plane.

At 1002, the system may select one of the candidates for road plane estimation.

At 1004, the system may convert all pixels from the UV coordinate space to the ground space coordinates e.g., XYZ coordinates.

At 1006, the system may estimate the road surface plane separately for each candidate selected.

At 1008, the system may calculate X, Y, and Z for the road surface while ignoring pixels of the selected candidate when calculating the road surface.

At 1010, the system may determine whether all candidates have been processed. If so, the process may proceed to 1012. If not, the process may return to block 1002 to select the next candidate.

At 1012, when all candidates have been processed, the system may proceed with the pixel validation process as discussed additionally below.

Figure 11:
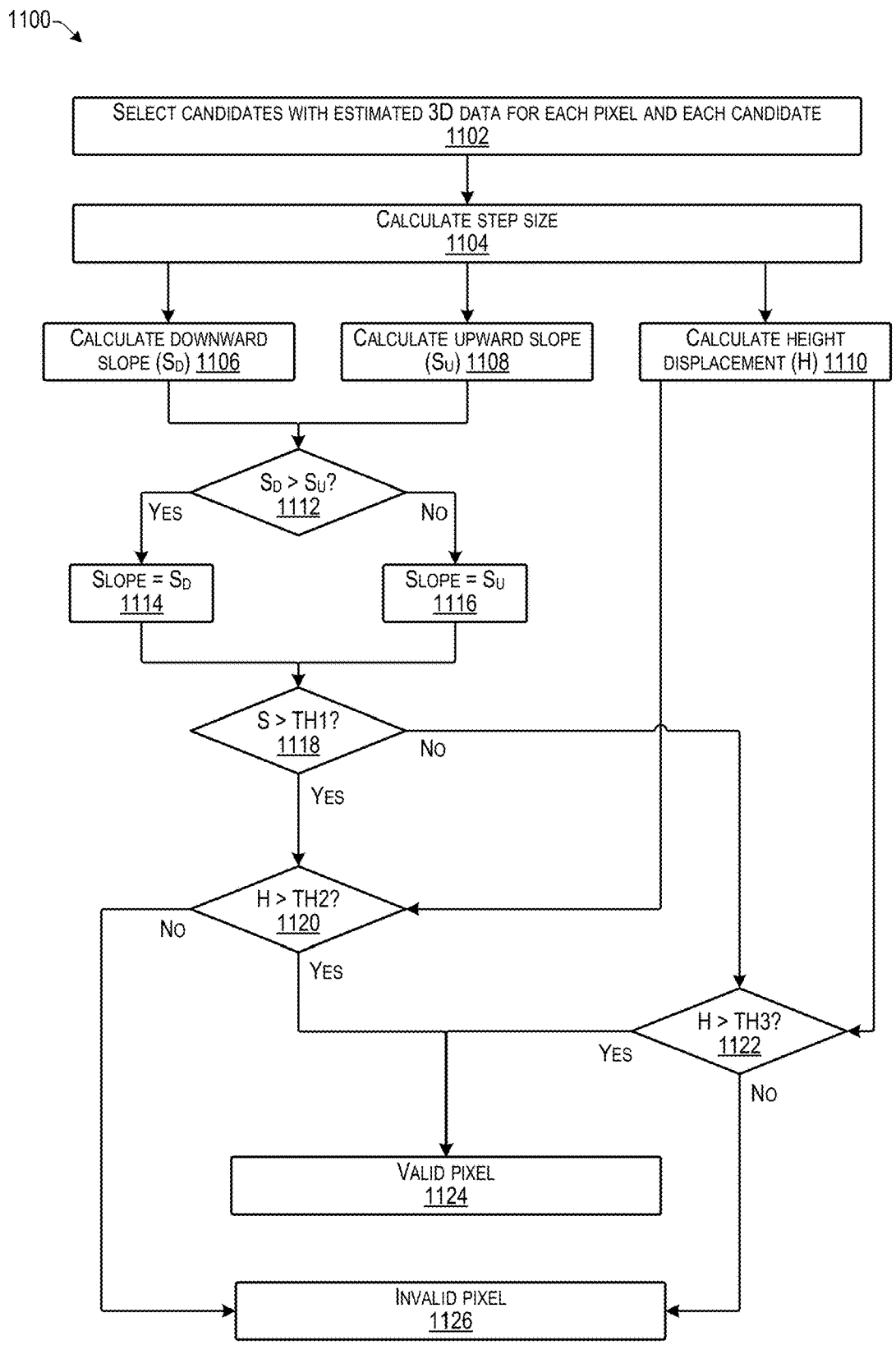
FIG. 11 is a flow diagram illustrating an example process for pixel validation according to some implementations.

FIG. 11 is a flow diagram illustrating an example process 1100 for pixel validation according to some implementations. In this example, after calculating X, Y, and Z values, the validity of each pixel validity may be determined using the pixel's geometric properties in the current scene. This process may also redefine the segmented candidate region to extract accurate shape and dimension management of small obstacles or other debris. Further, the extracted candidates may be represented by values in 0 or 1 to distinguish between pixels that belong to the debris candidates and pixels from neighboring regions such as the road surface.

At 1102, the system may select candidates with estimated 3D data for each pixel and each candidate.

At 1104, the system may calculate the step size for least one of downward slope, upward slope, or high displacement.

At 1106, the system may calculate the downward slope $S_D$.

At 1108, the system may calculate the upward slope $S_U$.

At 1110, the system may calculate the height displacement H.

At 1012, the system may determine whether the downward slope $S_D$ is greater than the upward slope $S_U$. If so, process goes to 1114. If not, the process goes to 1116.

At 1114, when the downward slope is greater than the upward slope, the system sets the slope equal to the downward slope $S_D$.

At 1116, when the downward slope is not greater than the upward slope, the system sets the slope equal to the upward slope $S_U$.

At 1118, the system determines whether the slope S is greater than a first threshold. If so, the process goes to 1120. If not, the process goes to 1122.

At 1120, when the slope is greater than the first threshold, the system determines whether the height displacement is greater than a second threshold. If so, the pixel is valid and the process goes to 1124. If not, the pixel is invalid and the process goes to 1126.

At 1122, when the slope is not greater than the first threshold, the system determines whether the height displacement is greater than a third threshold. If so, the pixel is valid and the process goes to 1124. If not, the pixel is invalid in the process goes 1126.

At 1124, the pixel has been determined to be valid. Accordingly, the system may retain the pixel as a valid pixel.

At 1126, the pixel has been determined to be invalid. Accordingly, the system does not include the pixel as part of the debris image.

Accordingly, unlike conventional debris detection, implementations herein may consider the slope of detected debris, such as a maximum slope, average slope, and so forth, to increase the detection distance for detecting debris. Furthermore, the first, second and third thresholds discussed above for use in the pixel validation algorithm may be determined based on statistical analysis using one or more models trained with data of known debris captured by a camera system, or through any of various other empirical techniques.

Figure 12:
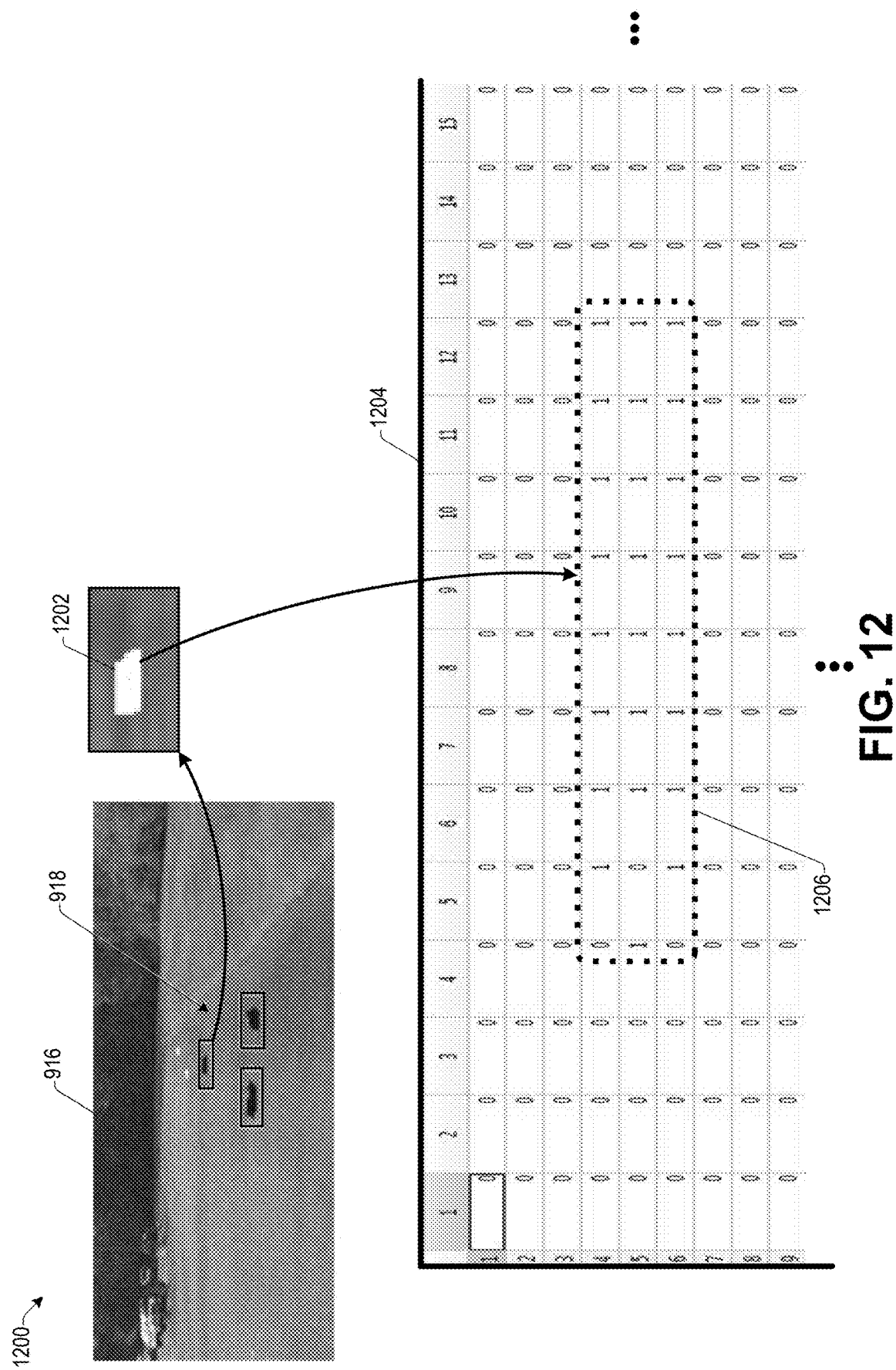
FIG. 12 illustrates an example of a selected candidate in matrix form according to some implementations.

FIG. 12 illustrates an example of a selected candidate in matrix form according to some implementations. Suppose that one of the candidates 1202 from the image 916 previously determined as discussed above, e.g., with respect to FIG. 9, is selected for pixel validation. The selected candidate 1202 may be represented in a matrix 1204 along with a surrounding area with each number in the matrix representing a pixel having a value of either zero or one to distinguish between pixels that belong to the debris candidates and pixels belonging to the neighboring region. In particular, in this example, while a one indicates pixels that belong to white regions, which may correspond to the debris candidate 1202 while pixels having a zero may correspond to areas neighboring to the white regions such as may belong to the road surface or the like. Accordingly, the candidate 1202 is represented by the area in the matrix 1204 surrounded by the dashed line 1206.

Figure 13:
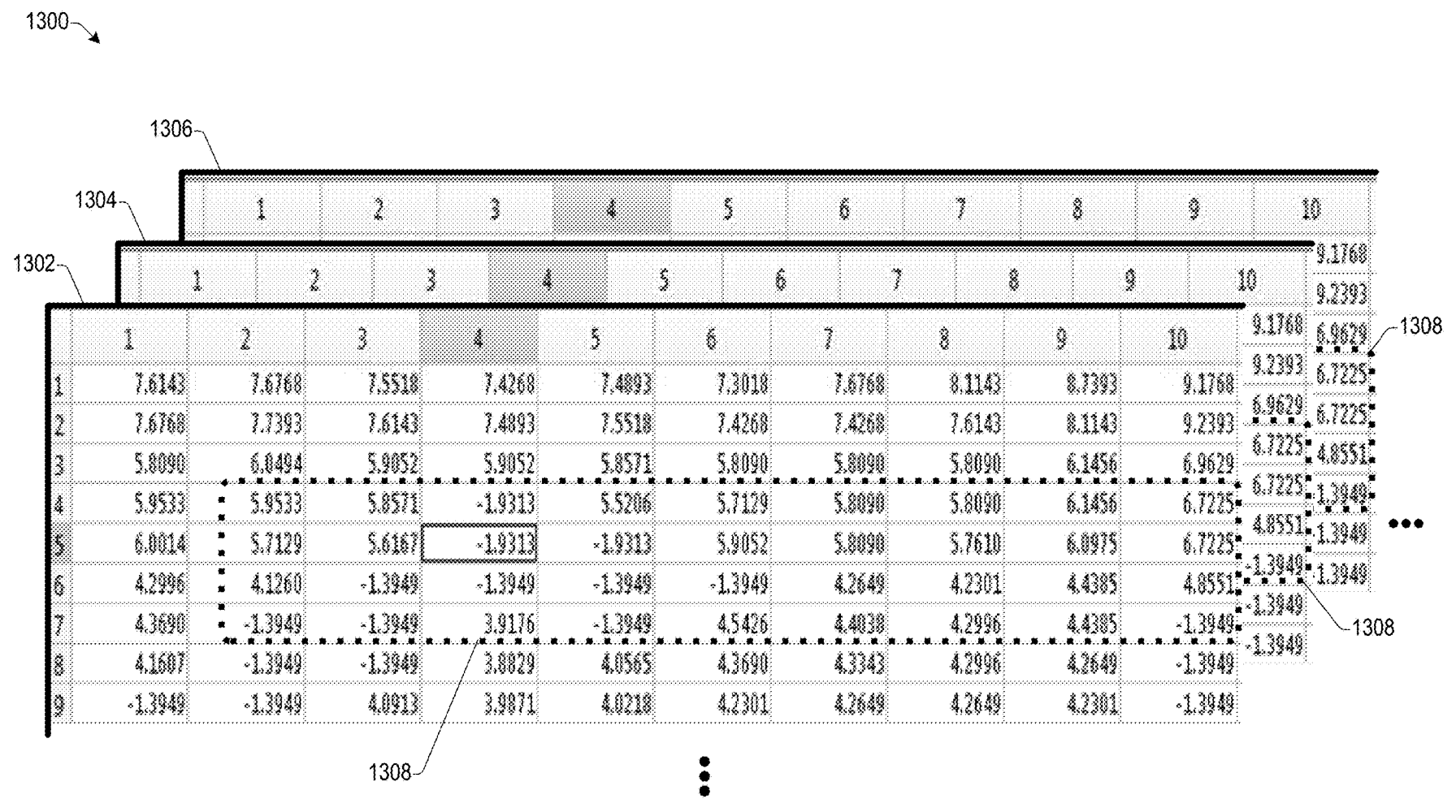

FIG. 13 illustrates an example 1300 of the selected candidate 1202 of FIG. 12 as a 3D map in matrix form according to some implementations. In this example, the selected candidate 1202 of FIG. 12 may represented by a plurality of matrices 1302, 1304, and 1306, that provide a 3D map with X, Y, Z values, i.e., the matrix 1302 may represent the X axis, matrix 1304 may represent the Y axis, and matrix 1306 may represent the Z axis of the XYZ coordinate system. As one example, the X coordinate may provide lateral position (right or left) information, the Y coordinate may provide height information, and the Z coordinate may provide distance information (e.g., in the direction of travel).

Using the disparity map and coordinate transformation matrix, X, Y and Z values are calculated for each and every pixel. For example, each pixel may be converted from u-v coordinate image plane to the XYZ coordinate real world 3D plane. Using these X, Y and Z values, the road plane estimation may be carried out, which provides detailed information about whether the road is flat or there is slope (e.g., a positive slope or negative slope) and so on. After the road plane is estimated, the Y coordinate (i.e., height information) may be updated based on the estimated road surface plane. The X, Y and Z values may be used for estimating uphill/downhill height and slope. The XYZ values may be arranged in matrix form to provide the matrices 1302, 1304 and 1306.

The dashed lines 1308 illustrate XYZ information that may be used for uphill/downhill calculations. The selected candidate 1202 discussed above with respect to FIG. 12 may correspond to the dashed line area 1308, e.g., on the respective matrices 1302, 1304 and 1306. For example, the 3D map may represent the uphill slope, downhill slope, uphill height and downhill height estimated using the disparity image for each pixel.

Figure 14:
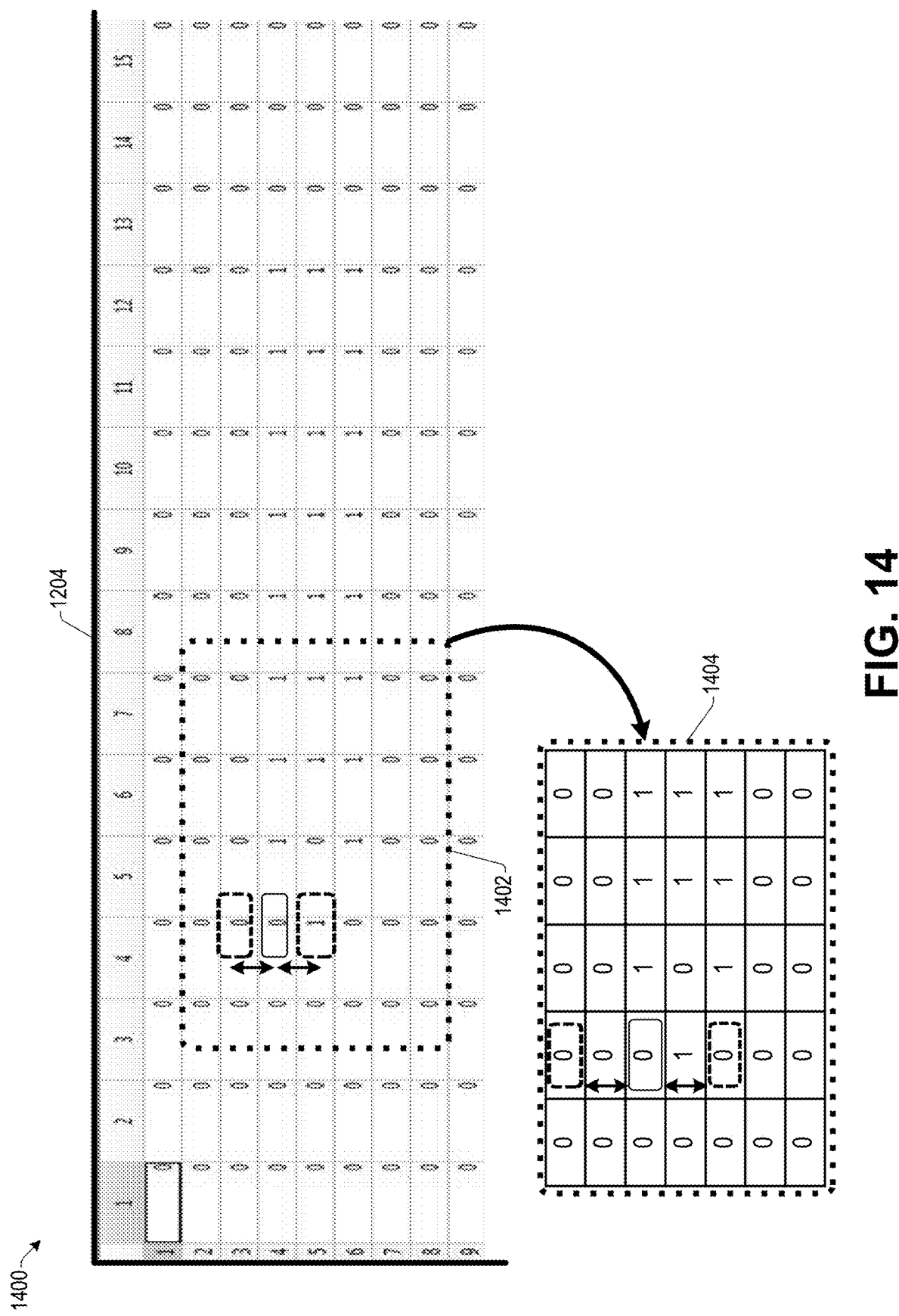
FIG. 14 illustrates an example of step size selection according to some implementations.

FIG. 14 illustrates an example 1400 of step size selection according to some implementations. In this example, the selected candidate is represented in the matrix 1204 as discussed above with respect to FIG. 12. The step size between a previous pixel (n−1) to a current pixel (n), and current to next pixel (n+1) may be estimated dynamically based on camera parameters and the current candidate's distance from the vehicle. For example, in the area 1402 indicated by the dashed line 1402 of the matrix 1204, step size selection is 1.

Suppose that the currently selected pixel is located at (4,4) in the matrix 1204. With a step size of 1, the previous pixel (n−1) is located at (3,4), and the next pixel (n+1) is located at (5,4). Alternatively, as indicated at 1404, a step size of two may be used in which case the previous pixel (n−1) is located at (2,4) and the next pixel (n+1) is located at (6,4).

Figure 15:
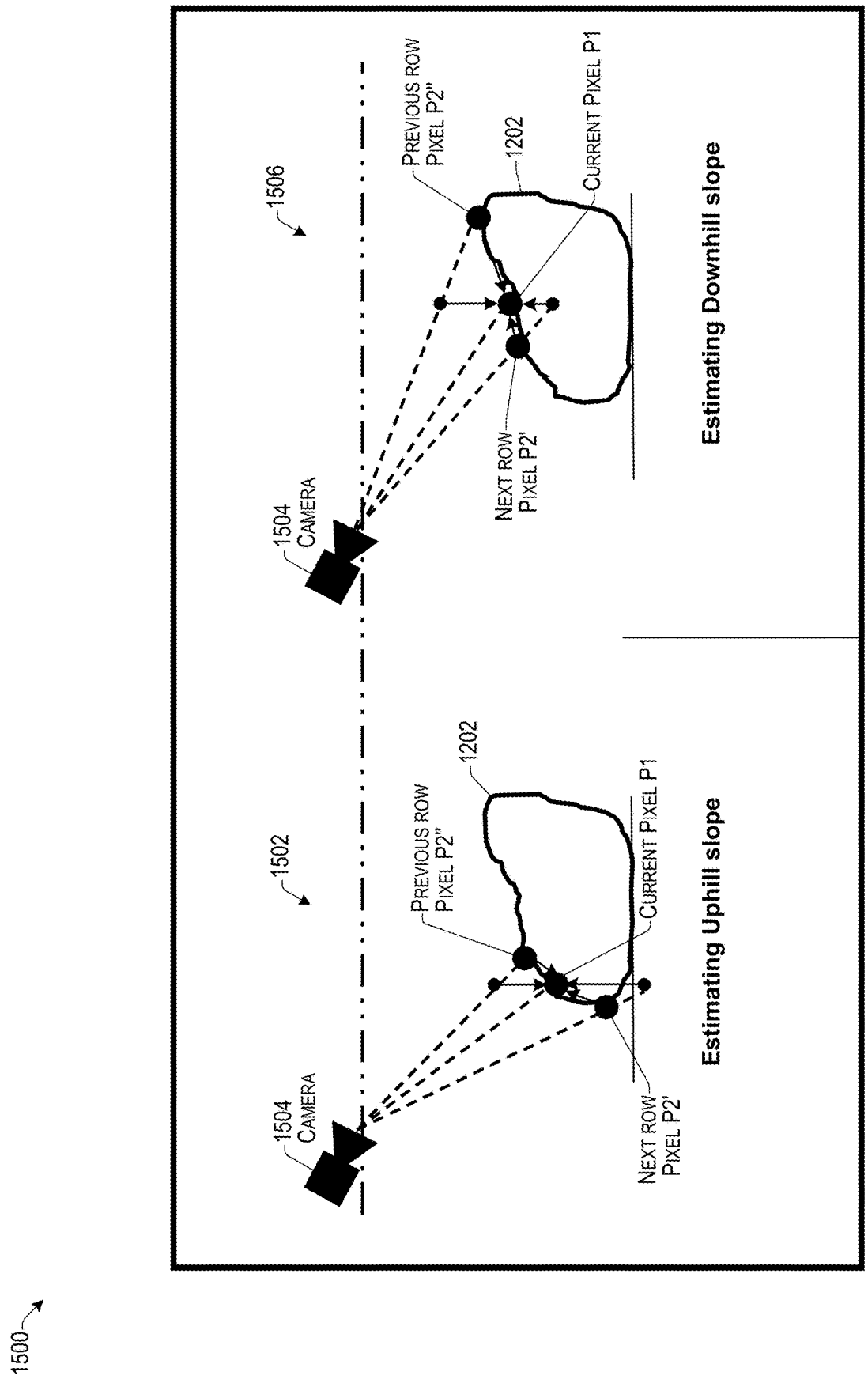
FIG. 15 illustrates examples of estimating uphill slope and downhill slope according to some implementations.

FIG. 15 illustrates examples 1500 of estimating uphill slope and downhill slope according to some implementations. In this example, as indicated at 1502, the uphill slope of the surface of the debris candidate 1202 may be determined on a pixel by pixel basis as captured by the camera 1504. For example, suppose that the current pixel is P1, then as discussed above with respect to FIG. 14, the next row pixel is P2' and the previous row pixel is P2". In this example, the uphill slope $S_U$ may be determined using the following equation:

$$S_U = \frac{P2''_y - P1_y}{P2''_z - P1_z} \qquad \text{EQ(3)}$$

Similarly, as indicated at 1506, the downhill slope of the surface of the debris candidate 1202 may also be determined. In this example, suppose that the current pixel is P1, then as discussed above with respect to FIG. 14, the next row pixel is P2' and the previous row pixel is P2". Thus, the downhill slope $S_D$ may be determined using the following equation:

$$S_D = \frac{P1_y - P2'_y}{P1_z - P2'_z} \qquad \text{EQ(4)}$$

Furthermore, the uphill height $H_D$ and the downhill height $H_U$ may be determined for each pixel based on the following equation:

$$H = \begin{cases} H_D = P1_y - P2'_y, H_D > H_U \\ H_D = P2''_y - P1_y, H_D > H_U \end{cases} \qquad \text{EQ(5)}$$

Figure 16:
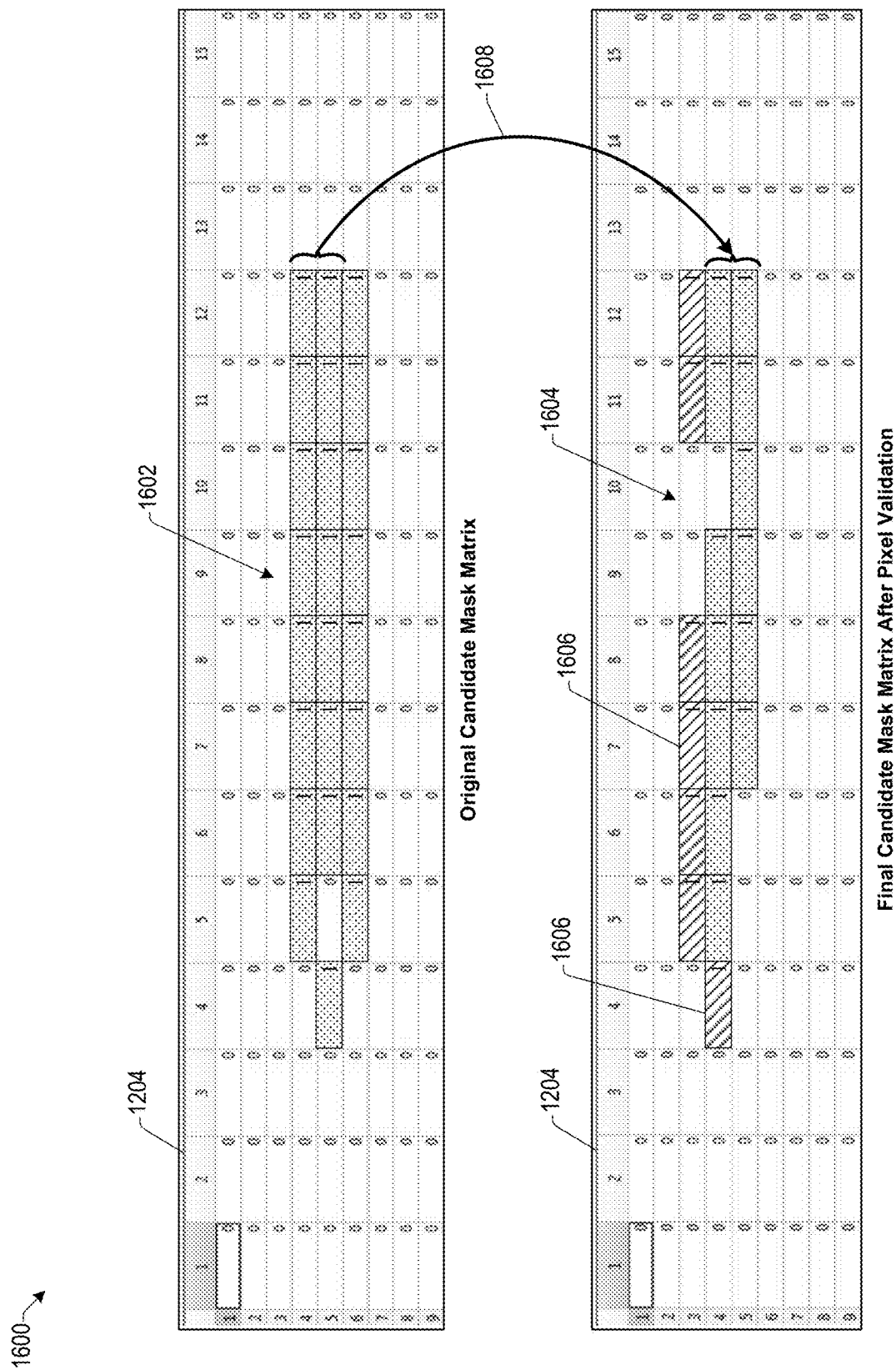
FIG. 16 illustrates an example of the mask matrix of the selected candidate before and after pixel validation according to some implementations.

FIG. 16 illustrates an example 1600 of the mask matrix of the selected candidate before and after pixel validation according to some implementations. After the uphill slope, downhill slope and height is calculated for each pixel of the selected candidate, each pixel may be compared with a threshold. As one example, the threshold may be selected using statistical analysis or empirical techniques. Based on this output, each pixel may be classified as valid or invalid, which classification may be subsequently used for feature extraction. Based on whether pixels are determined to be valid or invalid, the candidate mask may be updated in the matrix 1204.

In this example, the original candidate mask 1602 is illustrated in the upper example of the matrix 1204, and the updated candidate mask 1604 is illustrated in the lower example of the matrix 1204. In the original candidate mask 1602, the pixels in the original candidate occupied portions of rows 4, 5 and 6 of the matrix 1204. Following pixel validation, the pixels in row 6 have all been determined to be invalid, i.e., not included in the debris candidate, while a number of pixels 1606 in row 3 and one pixel in row 4 (as indicated by crosshatching) have been determined to be included in the debris candidate. Further, some original pixels in rows 4 and 5 were determined to be valid, as indicated by arrow 1608.

FIG. 17 illustrates an example data structure 1700 including features and corresponding feature strength according to some implementations. For instance, after validating the pixels of the debris candidates as discussed above, features may be extracted and used to accurately classify the candidates as debris or not debris. In the examples herein, a variety of different features may be used to differentiate between debris and the roadway or various other image anomalies that are not debris. The data structure 1700 includes features 1702, a threshold 1704 corresponding to each feature, a false positive rate 1706 for each feature, and a true positive rate 1708 for each feature.

In this example, five main features are specified which contribute to classifying the candidates into debris, although in other examples, additional or alternative features may be employed. The features in this example include an average height 1710 of the debris candidate, a maximum height 1712 of the debris candidate, an average slope 1714 of the debris candidate, a maximum slope 1716 of the debris candidate, and a peak slope percentage 1718 which may correspond to a percentage of pixels with a slope>5 or the like. Accordingly, implementations herein may employ two height based features and three slope based features.

In some cases, the thresholds 1704 may be determined using statistical analysis on large sets of image data. For instance, the image data may cover various scenarios such as different road surface conditions (e.g., road surface color such as asphalt or concrete etc.), weather conditions, time of the day and so on. Hence, the thresholds 1704 may be updated based on weather and road surface conditions.

Furthermore, the false positive rate 1706 and the true positive rate 1708 for each feature indicates that the height based features tend to be more accurate than the slope based features. Accordingly, the height-based features 1710 and 1712 are considered to be strong features 1720, and the slope based features 1714, 1716, and 1718 are considered to be weak features 1722. For instance, the strong features 1720 may reduce the weight multiplier to reduce false detection and thereby improve the detection accuracy. Furthermore, the weak features 1722 may help increase the weight multiplier and may thereby improve the detection distance.

Figure 18:
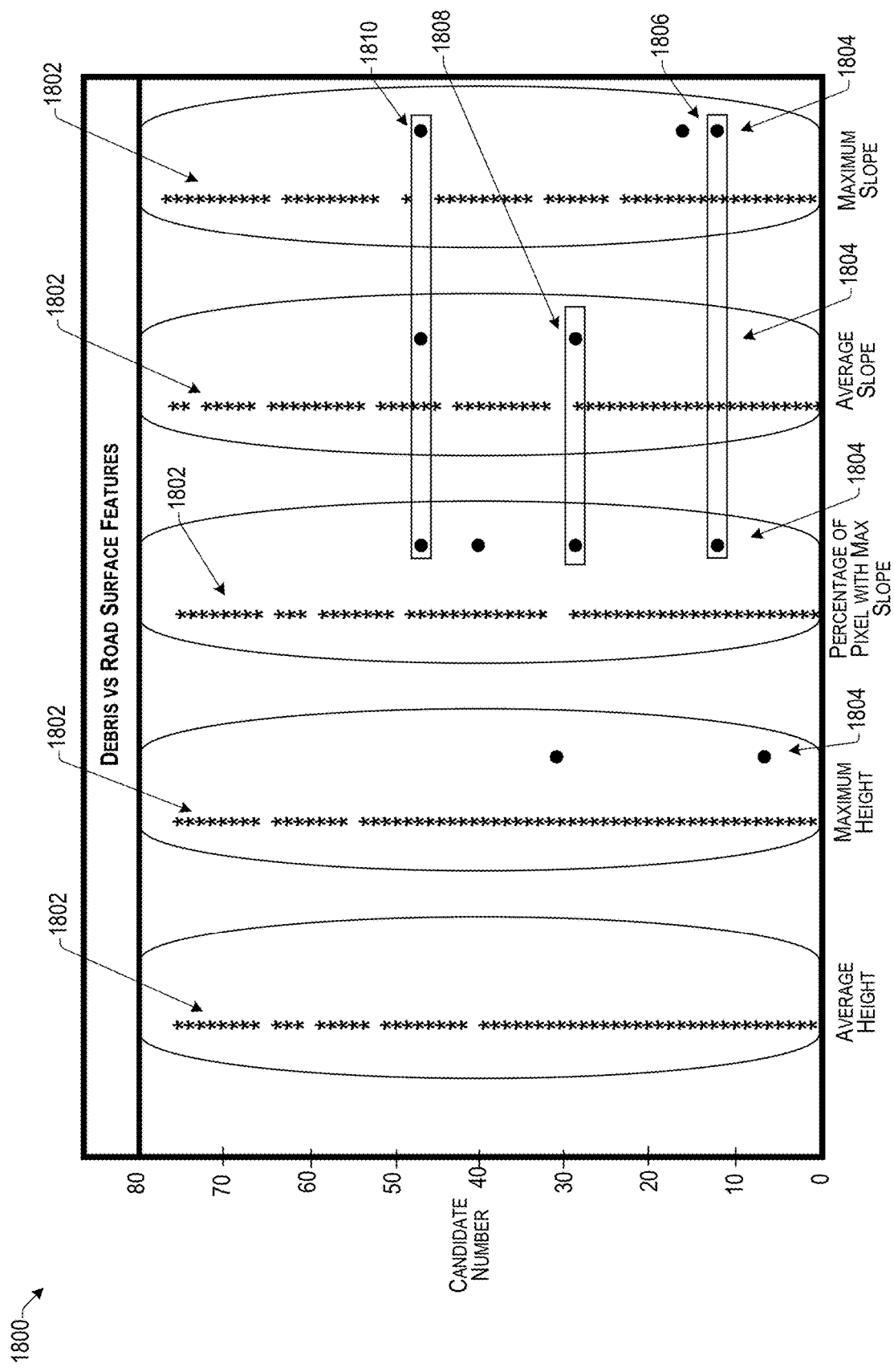
FIG. 18 illustrates an example of debris detection versus road surface false positives for the features discussed above with respect to FIG. 17 according to some implementations.

FIG. 18 illustrates an example of debris detection versus road surface false positives for the features discussed above with respect to FIG. 17 according to some implementations. For instance, features may be extracted for each candidate which are used for classification of the candidate as debris or not debris. Each feature may achieve separation between the road surface and the debris. Each feature may be compared with the others and analyzed. Based on the separation and immunity towards the noise/false positives features are classified into strong features and weak features, as discussed above with respect to FIG. 17. FIG. 18 shows a comparison of each features including a total number of true positive detections versus a total number of false positives for that feature. For example, conventional techniques may use all the pixels in an image to perform analysis of the image whereas implementations herein first validate the pixels to be used and may use only the validated pixels for subsequent feature extraction and classification, which may provide a validated average height, validated maximum height, validated distance and validated width information for the detected debris.

In the example of FIG. 18, the average height is shown to have a large number of true positive results as indicated at 1802, and no false positive results. Similarly, the maximum height is shown to have a large number of true positive results 1802, and two false positive results 1804 in which a portion of the roadway was falsely identified as debris. In addition, the percentage of pixel with maximum slope feature is shown to have four false positive results 1804, the average slope feature is shown to have two false positive results 1804 and the maximum slope feature is shown to have three false positive results 1804. In addition, as indicated at 1806, 1808, and 1810, several of the false positive results 1804 for the three slope-based features occurred for the same debris candidate resulting in common false positives for that particular debris candidate.

Figure 19:
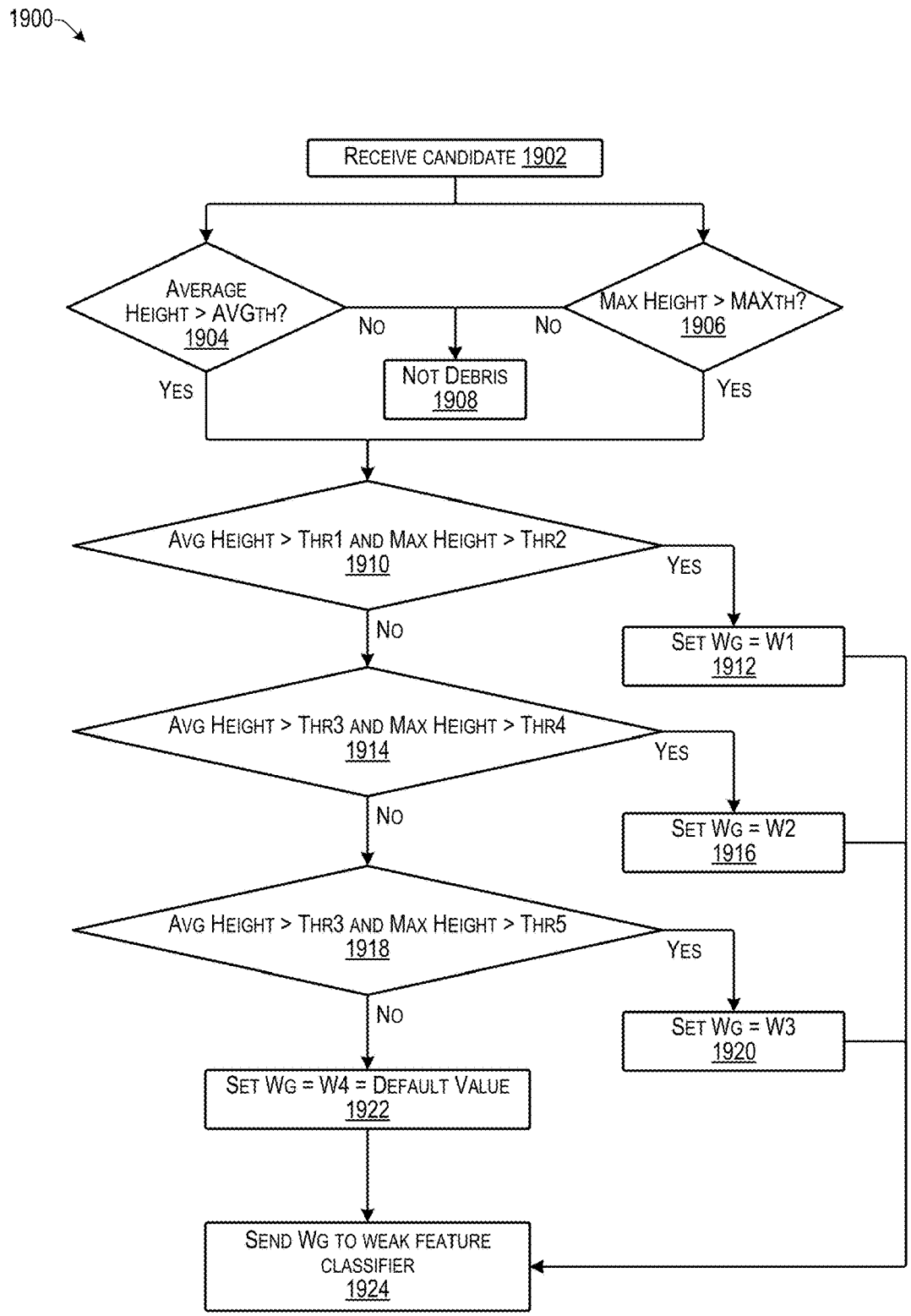
FIG. 19 illustrates an example strong classifier algorithm according to some implementations.

FIG. 19 illustrates an example strong feature classifier algorithm 1900 according to some implementations. For example, the strong classifier algorithm 1900 may be executed by the debris detection program on systems 200 or 300, as discussed above with respect to FIGS. 1-3. For instance, after all the features are extracted from a selected candidate the features are applied to the strong feature classifier algorithm 1900 first and then applied to a weak classifier algorithm as discussed additionally below with respect to FIG. 20. Using a combination of strong and weak feature classifiers, the debris candidate may be classified as debris or not debris with high accuracy. In the following operations, as one example, the weights (e.g., W1, W2, W3 and W4) may be determined based at least in part on true positive rates for the respective feature and the thresholds may be determined, e.g., as discussed above with respect to FIG. 17.

At 1902, the system receives a candidate for processing the strong features.

At 1904, the system determines whether the average height is greater than the average height threshold. If so, the process goes to 1910. If not, the process goes to 1908.

At 1906, the system also determines whether the maximum height associated with the candidate is greater than the maximum height threshold. If so, the process goes to 1910. If not, the process goes to 1908.

At 1908, if the average height of the received candidate is not higher than the average height threshold or if the maximum height of the received candidate is not higher than the maximum height threshold, then the received candidate is classified as not being debris and the system may initiate the algorithm 1900 for a different candidate.

At 1910, the system may determine whether the average height is greater than a first threshold and the maximum height is greater than a second threshold if so, the process goes to 1912. If not, the process goes to 1914.

At 1912, if the conditions at 1910 are met, the system may set weight $W_G$ equal to a first weight W1, and may proceed to block 1924.

At 1914, the system may determine whether the average height is greater than a third threshold and the maximum height is greater than a fourth threshold. If so, the process goes to 1916. If not, the process goes to 1918.

At 1916, if the conditions in 1914 are met, the system may set the weight $W_G$ equal to a second weight W2, and may proceed to block 1924.

At 1918, the system may determine whether the average height is greater than the third threshold and the maximum height is greater than a fifth threshold. If so, the process goes to 1920. If not, the process goes to 1922.

At 1920, if the conditions in 1918 are met, the system may set the weight $W_G$ equal to a third weight W3, and may proceed to block 1924.

At 1922, when the conditions in block 1918 are not met, the system may set the weight WG equal to a fourth weight W4 which may also be a default weight value.

At 1924, the system may send the weight $W_G$ to the weak feature classifier for further processing of the selected candidate.

Figure 20:
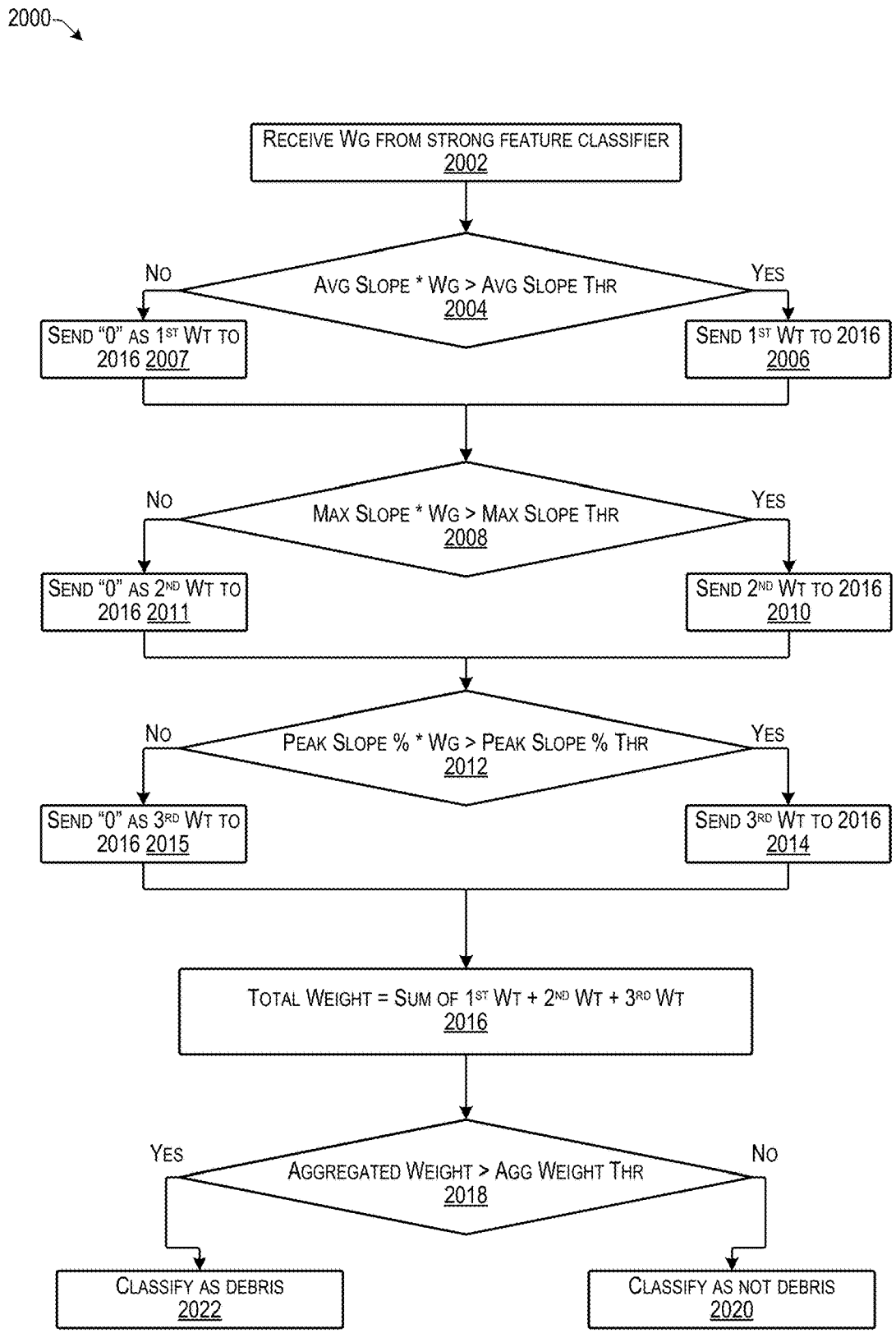
FIG. 20 illustrates an example of a weak classifier algorithm that may be executed according to some implementations.

FIG. 20 illustrates an example of a weak classifier algorithm 2000 that may be executed according to some implementations. For example, the weak classifier algorithm 2000 may be executed by the debris detection program 116 as discussed above, e.g., with respect to FIGS. 1-3. In this example, after a candidate has been passed through the strong feature classifier 1900, which removes most of the road surface candidates, the candidate and a corresponding weight $W_G$ determined by the strong feature algorithm 1900 may be received by the weak feature algorithm 2000. For instance, based on the strong features, the weight $W_G$ may be calculated and used as a multiplier for the for weak features. As discussed additionally below, the total aggregated weight from some or all of the weak features may be summed up and compared with one or more threshold values for ultimately classifying the candidate as debris or not debris. In the following operations, as one example, the weights (e.g., $1^{st}$ Wt, $2^{nd}$ Wt, and $3^{rd}$ Wt) may be determined based at least partially on true positive rates for the respective feature and the respective thresholds may be determined, e.g., as discussed above with respect to FIG. 17. As mentioned above, the thresholds may change based on weather, road surface conditions, and the like.

At 2002, the system executing the weak feature classifier algorithm 2000 receives a weight $W_G$ and an indication of an associated candidate from the strong feature classifier algorithm 1900 discussed above with respect to FIG. 19.

At 2004, the system determines whether the average slope multiplied by $W_G$ is greater than the average slope threshold. If so, the process goes to 2006. If not, the process goes to 2007.

At 2006, when the condition at 2004 is met, the system provides, to block 2016, the $1^{st}$ Wt, which may be a product of the weight $W_G$ and another weight associated with the average slope feature (e.g., based at least in part on the true positive rate for the average slope feature).

At 2007, when the condition at 2004 is not met, the system sets the $1^{st}$ Wt equal to zero and provides this value to block 2016.

At 2008, the system may determine whether the maximum slope multiplied by the weight $W_G$ is greater than the maximum slope threshold. If so, the process goes to 2010. If not, the process goes to 2011.

At 2010, when the condition at 2008 is met, the system provides the $2^{nd}$ Wt to the block 2016. For example, the $2^{nd}$ Wt may be a product of the weight $W_G$ and a weight associated with the maximum slope feature (e.g., based at least in part on the true positive rate for the maximum slope feature).

At 2011, when the condition at 2008 is not met, the system sets the $2^{nd}$ Wt equal to zero and provides this value to block 2016.

At 2012, the system determines whether the peak slope percentage multiplied by the weight $W_G$ is greater than the peak slope percentage threshold. If so, the process goes to 2014. If not, the process goes to 2015.

At 2014, when the condition at 2012 is met, the system provides the 3rd Wt to the block at 2016. For example, the $3^{rd}$ Wt may be a product of the weight $W_G$ multiplied by a weight associated with the peak slope percentage feature (e.g., based at least in part on the true positive rate for the peak slope percentage feature).

At 2015, when the condition at 2012 is not met, the system sets the $3^{rd}$ Wt equal to zero and provides this value to block 2016.

At 2016, the system determines an aggregated weight by summing the $1^{st}$ Wt, the $2^{nd}$ Wt and the $3^{rd}$ Wt received based on the decisions made at blocks 2004, 2008 and 2012, respectively.

At 2018, system determines whether the aggregated weight is greater than an aggregated weight threshold. If not, the process goes to 2020. If so, the process goes to 2022.

At 2020, when the aggregated weight is less than the aggregated weight threshold, the candidate is classified as not debris.

At 2022, when the aggregated weight exceeds the aggregated weight threshold, the candidate is classified as debris.

After one or more candidates are detected and classified as debris, the debris may be tracked for the rest of the frames and corresponding dimension information may be displayed or otherwise associated with an output. As one example, an image including the identified debris and further including debris size and distance information may be presented in an image of the roadway presented on a display to a driver of the vehicle, such as including a highlighting of the debris, the sounding of a warning signal, or the like. Alternatively, in the case of an AD or ADAS vehicle, the debris location and size information may be provided to the vehicle control program 118, e.g., as discussed above with respect to FIGS. 1-4. Based on vehicle speed, location and size of the debris, and other conditions, the system may determine one or more control signals to send to one or more vehicle systems for avoiding the debris.

In addition, as mentioned above with respect to FIGS. 1-3, the location, size and other information about the debris may be uploaded to a cloud server or other network computing device for storage in a debris information data structure. The debris information on the cloud may be aggregated with other debris information received from other vehicles to improve the accuracy of the debris information maintained at the network computing device. In addition, the other vehicles may receive the debris information in real time and may avoid the debris based on the received debris information. Furthermore, for every route planned by a vehicle or a driver, the service computing device may provide information related to debris, the debris location debris size preferred routes and other information while the debris is determined to remain in the vehicle travel path at the identified location.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   one or more processors; and
   one or more non-transitory computer-readable media including executable instructions, which, when executed by the one or more processors, configure the one or more processors to perform operations comprising:

receiving at least one image of a road;

determining at least one candidate group of pixels in the image as potentially corresponding to debris on the road;

determining at least two height-based features for the candidate group of pixels, the at least two height-based features including a maximum height associated with the candidate group of pixels relative to a surface of the road and an average height associated with the candidate group of pixels relative to the surface of the road;

determining at least one weighting factor based on comparing the at least two height-based features to respective thresholds;

determining one or more slope-based features associated with the candidate group of pixels;

determining at least one weight value for the one or more slope-based features;

determining an aggregated weight based on the at least one weight value and the weighting factor; and determining whether the group of pixels corresponds to debris based at least on the aggregated weight.

2. The system as recited in claim 1, the operations further comprising determining a validity of the pixels in the group of pixels based at least on determining whether individual pixels in the group of pixels represent the surface of the road.

3. The system as recited in claim 2, wherein the determining the validity of the pixels is further based on determining, for the individual pixels in the group of pixels at least one of:

an upward slope associated with an individual pixel relative to neighboring pixels;

a downward slope associated with the individual pixel relative to the neighboring pixels; or a height associated with the individual pixel relative to neighboring pixels.

4. The system as recited in claim 2, the operations further comprising determining a road plane estimation of the surface of the road prior to determining the validity of the pixels in the group of pixels.

5. The system as recited in claim 1, the operations further comprising:

determining a region of interest in the image based at least in part on lane information determined from the image; and determining the at least one candidate group of pixels in the image based at least on determining that the at least one candidate group of pixels is located within the region of interest.

6. The system as recited in claim 1, wherein two images are received from a stereo camera, the operations further comprising:

determining a disparity image from the received images;

determining edge information for at least one of the received images;

determining a modified disparity image based on the disparity image and the edge information; and determining the at least one candidate group of pixels from the modified disparity image.

7. The system as recited in claim 1, wherein the one or more slope-based features include at least one of:

an average slope associated with individual pixels relative to neighboring pixels;

a maximum slope associated with individual pixels; or a percentage of pixels in the group of pixels associated with a slope that exceeds a specified value.

8. The system as recited in claim 1, the operations further comprising sending at least one control signal based on determining that the group of pixels corresponds to debris, the at least one control signal including at least one of:

an instruction for controlling a vehicle to cause the vehicle to avoid the debris;

an instruction to cause an alert;

an instruction to cause presentation of information related to the debris on a display.

9. The system as recited in claim 1, the operations further comprising:

based on determining that the group of pixels corresponds to debris, sending debris information related to the debris to a computing device over a network, to cause, at least in part, the computing device to store the debris information in a data structure; and receiving additional debris information from the computing device, the debris information indicating a location of additional debris in another roadway; and determining a route to a destination based at least on the additional debris information.

10. A method comprising:

receiving, by one or more processors, at least one image of a road;

determining at least one candidate group of pixels in the image as potentially corresponding to debris on the road;

determining at least two height-based features for the candidate group of pixels, the at least two height based features including a maximum height associated with the candidate group of pixels relative to a surface of the road and an average height associated the candidate group of pixels relative to the surface of the road;

determining at least one weighting factor based on comparing the at least two height-based features to respective thresholds; and determining whether the group of pixels corresponds to debris based at least on the comparing.

11. The method as recited in claim 10, further comprising determining one or more slope-based features associated with the candidate group of pixels, the one or more slope-based features comprising at least one of:

an average slope associated with individual pixels relative to neighboring pixels;

a maximum slope associated with individual pixels; or a percentage of pixels in the group of pixels associated with a slope that exceeds a specified value.

12. The method as recited in claim 11, further comprising applying the at least one weighting factor to at least one weight value for at least one of the one or more slope-based features to determine an aggregated weight; and determining whether the group of pixels corresponds to debris based at least on the aggregated weight.

13. The method as recited in claim 10, further comprising determining a validity of the pixels in the group of pixels based at least on determining whether individual pixels in the group of pixels represent the surface of the road.

14. The method as recited in claim 10, further comprising determining a region of interest in the image based at least in part on lane information determined from the image; and determining the at least one candidate group of pixels in the image based at least on determining that the at least one candidate group of pixels is located within the region of interest.

15. The method as recited in claim 10, wherein two images are received from a stereo camera, the method further comprising
determining a disparity image from the received images;
determining edge information for at least one of the received images;
determining a modified disparity image based on the disparity image and the edge information; and
determining the at least one candidate group of pixels from the modified disparity image.

16. A system comprising:
a one or more processors; and
one or more non-transitory computer-readable media including executable instructions, which, when executed by the one or more processors, configure the one or more processors to perform operations comprising:
receiving at least one image of a road traversed by a vehicle;
determining at least one candidate group of pixels in the image as potentially corresponding to debris on the road;
determining one or more height-based features for the candidate group of pixels;
determining a weighting factor based on comparing the one or more height-based features to a respective threshold;
determining a plurality of slope-based features associated with the candidate group of pixels, the slope-based features including at least one of:
an average slope associated with individual pixels relative to neighboring pixels;
a maximum slope associated with the individual pixels; or
a percentage of pixels in the group of pixels associated with a slope that exceeds a specified value;
applying the weighting factor to at least one weight value for at least one of the plurality of slope-based features to determine an aggregated weight; and
determining whether the group of pixels corresponds to debris based at least on the aggregated weight.

17. The system as recited in claim 16, the operations further comprising determining a validity of the pixels in the group of pixels based at least on determining whether individual pixels in the group of pixels represent the surface of the road.

18. The system as recited in claim 16, the operations further comprising:
determining one or more height-based features for the candidate group of pixels, the one or more height based features including at least one of:
a maximum height associated with the candidate group of pixels relative to a surface of the road, or
an average height associated with the candidate group of pixels relative to the surface of the road;
determining the at least one weighting factor based on comparing at least one of the height-based features to a threshold.

19. The system as recited in claim 16, the operations further comprising:
determining a region of interest in the image based at least in part on lane information determined from the image; and
determining the at least one candidate group of pixels in the image based at least on determining that the at least one candidate group of pixels is located within the region of interest.

20. The system as recited in claim 16, wherein two images are received from a stereo camera, the operations further comprising:
determining a disparity image from the received images;
determining edge information for at least one of the received images;
determining a modified disparity image based on the disparity image and the edge information; and
determining the at least one candidate group of pixels from the modified disparity image.

* * * * *